(12) United States Patent
Natori

(10) Patent No.: US 11,662,960 B2
(45) Date of Patent: May 30, 2023

(54) INFORMATION PROCESSING APPARATUS AND METHOD FOR CONTROLLING THE SAME

(71) Applicant: CANON KABUSHIKI KAISHA, Tokyo (JP)

(72) Inventor: Takuya Natori, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 17/212,743

(22) Filed: Mar. 25, 2021

(65) Prior Publication Data

US 2021/0311676 A1   Oct. 7, 2021

(30) Foreign Application Priority Data

Apr. 3, 2020   (JP) .............................. JP2020-067703

(51) Int. Cl.
*G06F 3/12*   (2006.01)
(52) U.S. Cl.
CPC ............ *G06F 3/1208* (2013.01); *G06F 3/125* (2013.01); *G06F 3/126* (2013.01); *G06F 3/1241* (2013.01); *G06F 3/1254* (2013.01); *G06F 3/1256* (2013.01); *G06F 3/1258* (2013.01)
(58) Field of Classification Search
None
See application file for complete search history.

(56) References Cited

U.S. PATENT DOCUMENTS

| 6,847,466 | B1* | 1/2005 | Gazdik | G06F 3/1205 358/1.15 |
| 11,340,842 | B2* | 5/2022 | Takenaka | G06F 3/1259 |
| 2003/0053105 | A1* | 3/2003 | Morooka | G06F 3/1288 358/1.6 |
| 2004/0136023 | A1* | 7/2004 | Sato | G06F 3/1241 358/1.14 |
| 2015/0302284 | A1* | 10/2015 | Ido | G03G 15/556 358/1.9 |

FOREIGN PATENT DOCUMENTS

JP   2017038242 A   2/2017

* cited by examiner

*Primary Examiner* — Dov Popovici
(74) *Attorney, Agent, or Firm* — Canon U.S.A., Inc. IP Division

(57) ABSTRACT

An apparatus includes a setting unit and a control unit. The setting unit performs a first print setting indicating a poster printing function that divides a single piece of image data into a plurality of pieces of image data and generates print jobs, and a second print setting indicating a correction function for correcting calculated gray values when an image processing apparatus converts a plurality of pieces of color image data to grayscale, based on a number of colors acquired from each of the plurality of pieces of color image data. The control unit restricts the setting unit from performing the first print setting and the second print setting. In a state where one of the first print setting and the second print setting is performed by the setting unit, the control unit controls the setting unit not to perform the other print setting.

20 Claims, 24 Drawing Sheets

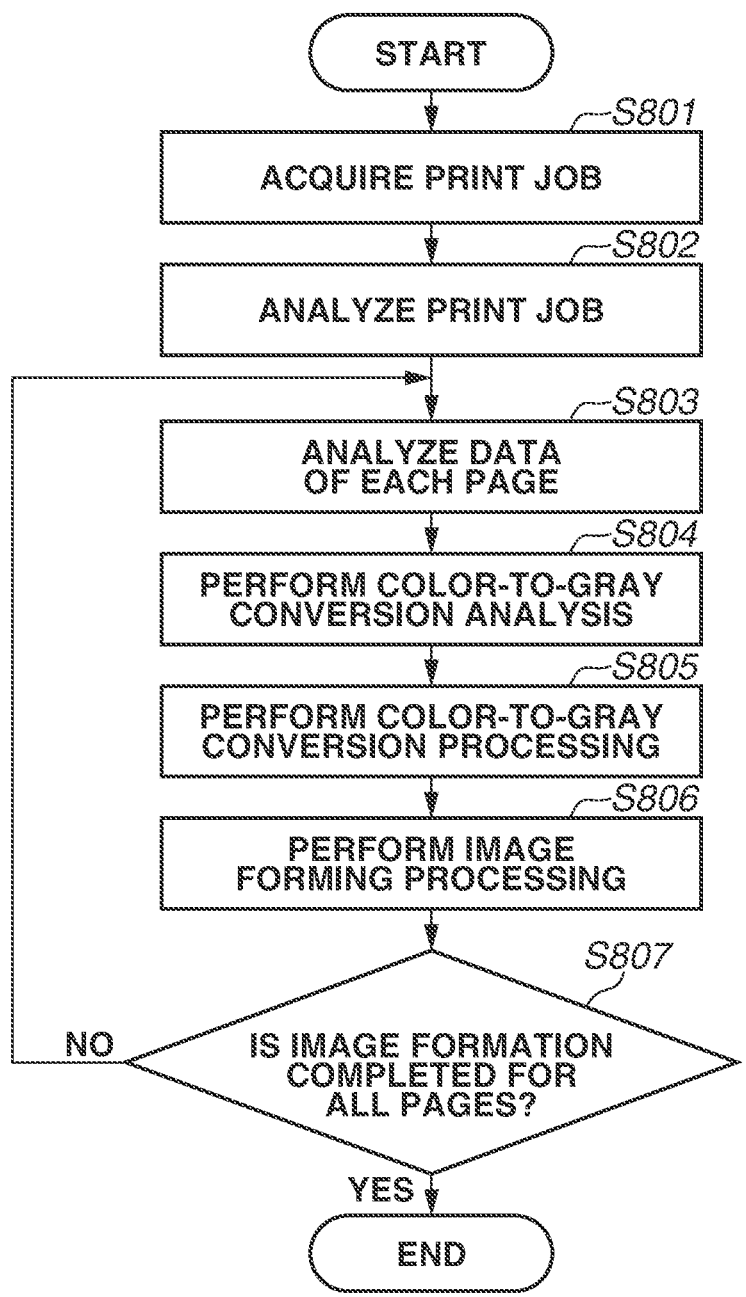

| INPUT IMAGE | R | G | B | Gray |
|---|---|---|---|---|
| COLOR 1 | 95 | 155 | 213 | 144 |
| COLOR 2 | 237 | 125 | 49 | 150 |
| COLOR 3 | 112 | 173 | 71 | 143 |
| COLOR 4 | 145 | 145 | 145 | 145 |

| INPUT IMAGE | R | G | B | Gray |
|---|---|---|---|---|
| COLOR 1 | 95 | 155 | 213 | 144 |
| COLOR 2 | 237 | 125 | 49 | 150 |
| COLOR 3 | 112 | 173 | 71 | 141 |
| COLOR 4 | 145 | 145 | 145 | 147 |

FIG.10A
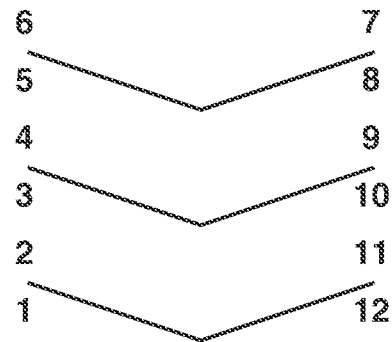
FIG.10B
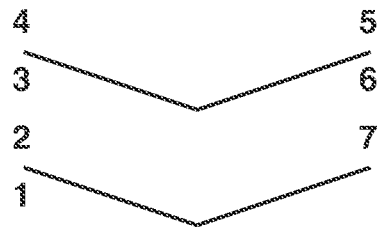
FIG.10C
FIRST SHEET: FRONT
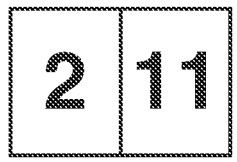
SECOND SHEET: FRONT
THIRD SHEET: FRONT
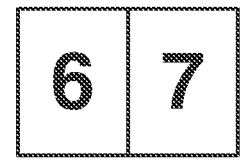
FIRST SHEET: BACK
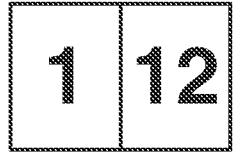
SECOND SHEET: BACK
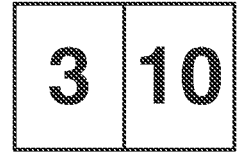
THIRD SHEET: BACK
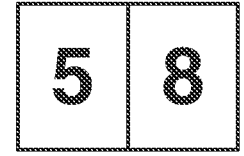
FIG.10D
FIRST SHEET: FRONT
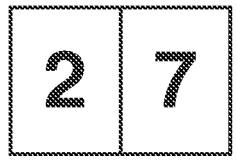
SECOND SHEET: FRONT
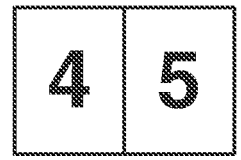
FIRST SHEET: BACK
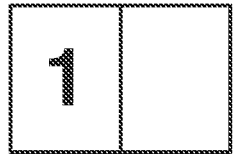
SECOND SHEET: BACK
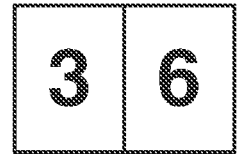

INFORMATION PROCESSING APPARATUS AND METHOD FOR CONTROLLING THE SAME

BACKGROUND OF THE DISCLOSURE

Field of the Disclosure

The aspect of the embodiments relates to an information processing apparatus and a method for controlling the information processing apparatus.

Description of the Related Art

In an image processing apparatus, in a case where color data represented by colors in a red, green, and blue (RGB) format is to be output in a grayscale format, input RGB values are generally converted to grayscale using a predetermined conversion formula to generate output data. As an example of the predetermined conversion formula, there is National Television System Committee (NTSC) conversion. Such color conversion is effective in a case where the result of output in the grayscale format requires gradation characteristics. The NTSC conversion is processing of weighting each of R, G, and B for each color by using a predetermined coefficient, calculating the gray value of the color, and then inverting and changing the calculated gray value to a density signal.

However, in a case where the RGB values of input color data are converted to grayscale using a predetermined conversion formula, two colors different in the original RGB values may become the same or close as a result of the grayscale conversion.

In this case, the two colors different in the original RGB values cannot be distinguished from each other as a result of output in the grayscale format. Particularly, in a case where a graph is drawn so that two colors are partially superimposed or brought into contact with each other, the boundary between the two colors disappears. Thus, discrimination between colors may deteriorate.

Japanese Patent Application Laid-Open No. 2017-38242 discusses a technique for improving the discrimination of the colors between black and white. More specifically, the number of colors in image data is analyzed on a page-by-page basis. Then, correction is performed for each color so that the grayscale values of the respective colors after grayscale conversion are away from each other and a conversion table is created for each page. Then, the colors are converted to grayscale based on the created conversion table.

SUMMARY OF THE DISCLOSURE

According to an aspect of the embodiments, an information processing apparatus includes a transmission interface (IF) configured to transmit a print job to an image processing apparatus, and a controller having one or more processors which execute instructions stored in one or more memories. The controller is configured to perform a first print setting indicating a poster printing function that divides a single piece of image data into a plurality of pieces of image data and generates print jobs, and a second print setting indicating a correction function for correcting calculated gray values when the image processing apparatus converts a plurality of pieces of color image data to grayscale, based on a number of colors acquired from each of the plurality of pieces of color image data, generate a print job based on the performed first print setting or the performed second print setting and image data, and cause the transmission IF to transmit the generated print job. The controller is configured to, in a state where one of the first print setting and the second print setting is performed, not perform the other print setting.

Further features of the disclosure will become apparent from the following description of exemplary embodiments with reference to the attached drawings.

BRIEF DESCRIPTION OF THE DRAWINGS

FIG. 8 is a flowchart illustrating a general overview of an analysis that is performed to generate image data for printing according to the first exemplary embodiment.

FIGS. 9A and 9B are diagrams each illustrating an example of a grayscale conversion table according to the first exemplary embodiment.

FIGS. 10A to 10D are schematic diagrams illustrating bookbinding printing according to the first exemplary embodiment.

DESCRIPTION OF THE EMBODIMENTS

Exemplary embodiments of the disclosure will be described in detail with reference to the attached drawings. The following exemplary embodiments do not limit the disclosure according to the appended claims, and not all the combinations of the features described in the exemplary embodiments are essential for a method for solving the issues in the disclosure. The exemplary embodiments will be described below using an image processing apparatus as an example of an information processing apparatus.

Figure 1:
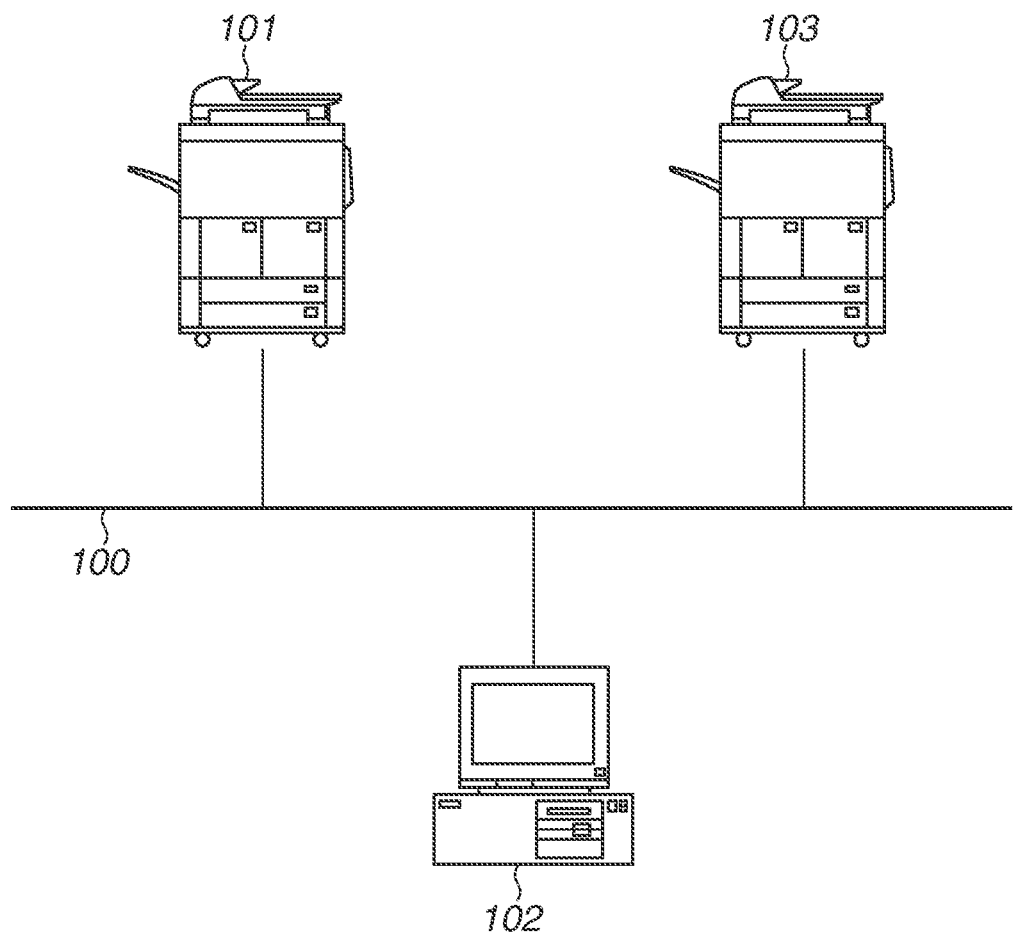
FIG. 1 is a diagram illustrating a configuration of a printing system according to a first exemplary embodiment.

A configuration of a printing system according to a first exemplary embodiment will be described. FIG. 1 illustrates an example of the printing system according to the present exemplary embodiment. An image processing apparatus 101 and an information processing apparatus 102 can connect to each other via a network 100. An operating system (OS) and an application are installed on the information processing apparatus 102. In this system, a user transmits a print job from the information processing apparatus 102 to the image processing apparatus 101 using an application. In a case where the information processing apparatus 102 is an information apparatus typified by a general personal computer (PC), the information processing apparatus 102 can be configured to transmit a print job to the image processing apparatus 101, which is the target apparatus, using a printer driver as an application.

Figure 2:
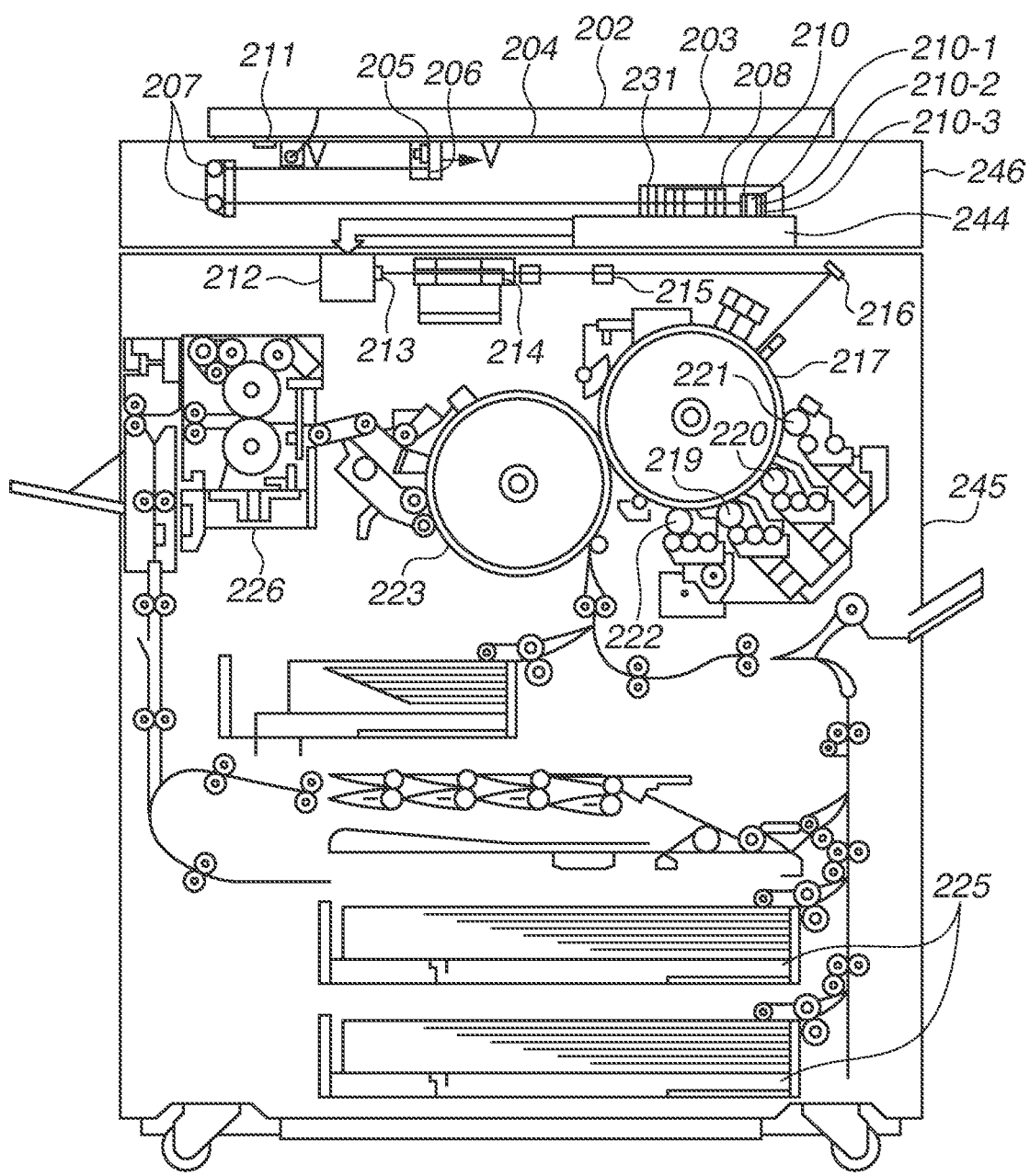
FIG. 2 is a diagram illustrating a configuration of an image processing apparatus according to the first exemplary embodiment.

FIG. 2 illustrates an external view of the image processing apparatus 101.

In the image processing apparatus 101, a document 204 is placed between a platen glass 203 and a document pressing plate 202. The document 204 is irradiated with light from a lamp 205. The reflected light from the document 204 is guided to mirrors 206 and 207. A lens 208 forms an image of the light on a 3-line sensor 210. The lens 208 is covered by an infrared cut filter 231.

A motor (not illustrated) moves a mirror unit including the mirror 206 and the lamp 205 at a velocity V and moves a mirror unit including the mirrors 207 at a velocity V/2 in the direction indicated by an arrow. More specifically, each of the mirror units moves in a direction (sub-scanning direction) perpendicular to an electrical scanning direction (main scanning direction) of the 3-line sensor 210 to scan the entire surface of the document 204.

The 3-line sensor 210 includes charge-coupled devices (CCDs) 210-1 to 210-3 on three lines. The 3-line sensor 210 performs color separation of input light information to read red (R), green (G), and blue (B) color components from the full-color information, and then transmits the respective color component signals to a signal processing unit 244. Each of the CCDs 210-1 to 210-3 in the 3-line sensor 210 includes light-receiving elements corresponding to 5000 pixels. Each of the CCDs 210-1 to 210-3 can read the width (297 mm) in the short direction of an A3-size document, which is the maximum document size that can be placed on the platen glass 203, at a resolution of 600 dpi.

A standard white plate 211 is used to correct data read by the CCDs 210-1 to 210-3 of the 3-line sensor 210. The standard white plate 211 has a white color exhibiting substantially uniform reflection characteristics with visible light.

The signal processing unit 244 electrically processes the image signals input from the 3-line sensor 210 to generate cyan (C), magenta (M), yellow (Y), and black (K) color component signals. Then, the signal processing unit 244 transmits the generated CMYK color component signals to an image output unit 245. An image output at this time is a CMYK image subjected to halftone processing such as dithering.

The image output unit 245 transmits, to a laser driver 212, a C, M, Y, or K image signal transmitted from an image reading unit 246. The laser driver 212 modulates and drives a semiconductor laser element 213 based on the image signal input to the laser driver 212. A laser beam output from the semiconductor laser element 213 scans a photosensitive drum 217 via a polygon mirror 214, an F-0 lens 215, and a mirror 216 to form an electrostatic latent image on the photosensitive drum 217.

A developing unit includes a magenta developing unit 219, a cyan developing unit 220, a yellow developing unit 221, and a black developing unit 222. The four developing units 219 to 222 alternately come into contact with the photosensitive drum 217 to develop the electrostatic latent image formed on the photosensitive drum 217 with toner of the corresponding colors and form a toner image. A recording sheet supplied from either of recording sheet cassettes 225 is wrapped around a transfer drum 223, and the toner image on the photosensitive drum 217 is transferred onto the recording sheet.

Figure 3:
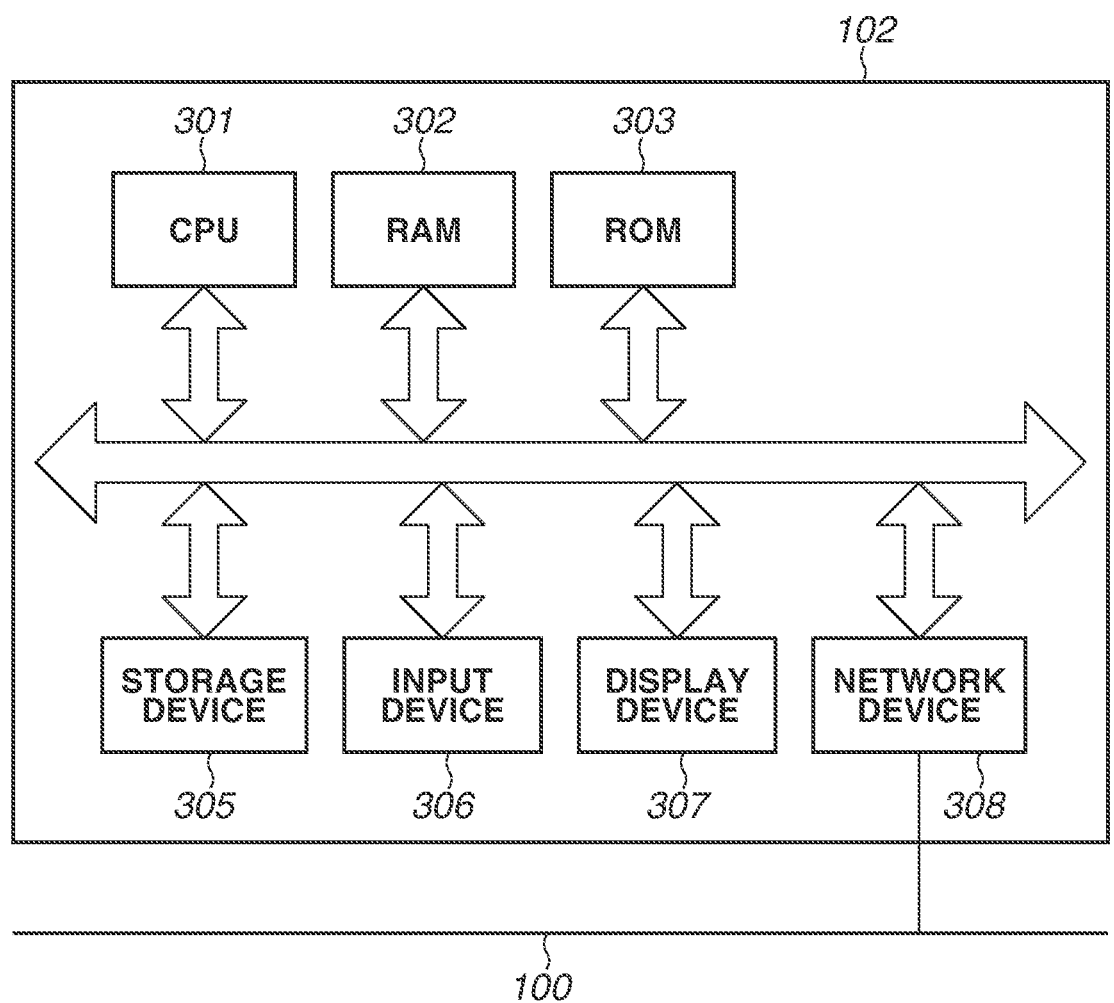
FIG. 3 is a block diagram illustrating an information processing apparatus according to the first exemplary embodiment.

Next, hardware configurations of the information processing apparatus 102 and the image processing apparatus 101 in the printing system will be described with reference to FIGS. 3 and 4. FIG. 3 is a block diagram of the information processing apparatus 102. An input device 306 is, for example, a keyboard, a mouse, or a touch panel and is used by the user to operate the information processing apparatus 102. A display device 307 is a display used by the user to operate the information processing apparatus 102.

For example, like a touch panel, the display device 307 may partially or entirely serve as the input device 306. A storage device 305 is a storage medium typified by a non-volatile hard disk for saving a large amount of data, and an application and data are read from and written to the storage device 305. A network device 308 is connected to the network 100 described with reference to FIG. 1 and can communicate with another apparatus.

An initial program for starting the information processing apparatus 102 and a basic program for controlling the modules of the information processing apparatus 102 are normally stored in a read-only memory (ROM) 303. An OS and an application are stored in the storage device 305. When the information processing apparatus 102 is powered on, a computer startup program (boot loader) stored in the ROM 303 is executed first. Then, the program loads the OS stored in the storage device 305 into a random-access memory (RAM) 302 and then passes a control right to the OS. The OS further loads a required module and a required driver from the storage device 305 into the RAM 302. Furthermore, based on an instruction from the user, the OS loads a required application from the storage device 305 into the RAM 302 to execute the application.

Figure 4:
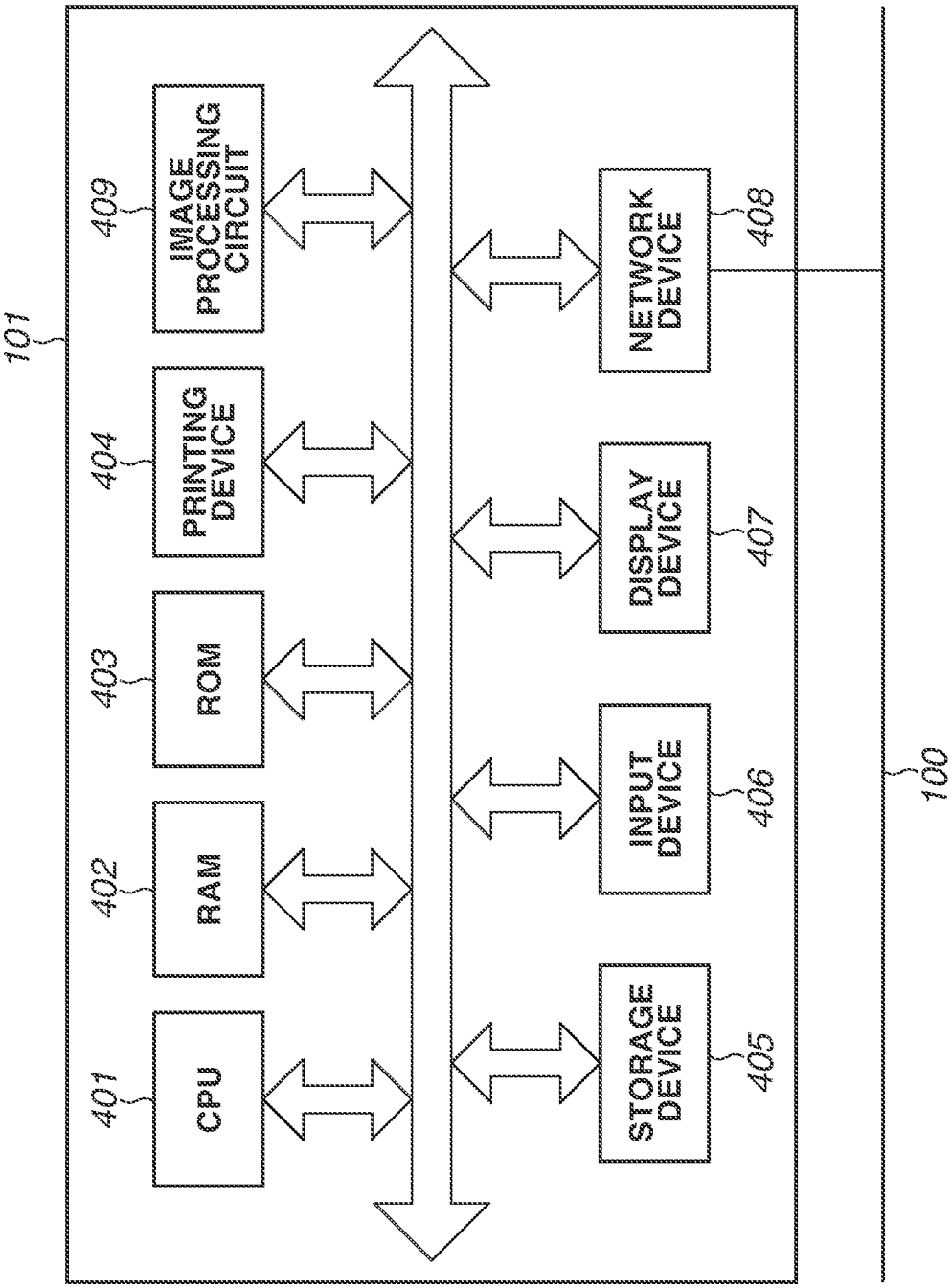
FIG. 4 is a block diagram illustrating the image processing apparatus according to the first exemplary embodiment.

FIG. 4 is a block diagram of the image processing apparatus 101. A RAM 402, a ROM 403, a storage device 405, and a network device 408 are similar to those of the information processing apparatus 102, and thus the detailed description thereof is omitted.

The network device 408 is connected to the network 100 and can communicate with another apparatus. For example, the network device 408 can receive print data from the information processing apparatus 102.

The storage device 405 is a storage medium typified by a non-volatile hard disk for saving a large amount of data, and an application and data are read from and written to the storage device 405. The storage device 405 stores a print job received by the network device 408.

An input device 406 may include a numeric keypad or various buttons. A printing device 404 loads print data included in a print job from the RAM 402, and prints the print data to output a print product.

A display device 407 receives an instruction or a setting operation from the user, and displays apparatus information regarding the image processing apparatus 101, job progress information, various user interface screens, and the like. In a case where the display device 407 is a touch panel, the display device 407 may include at least a part of the input device 406. Setting information received by the input device 406 is stored in the storage device 405.

An image processing circuit 409 reads a raster image and an attribute image stored in the storage device 405 and performs various types of image processing for optimizing the raster image based on parameters. The image processing circuit 409 also performs image processing based on the setting information provided from the input device 406. The image processing circuit 409 also performs processing for converting a color raster image into a gray raster image.

Figure 5:
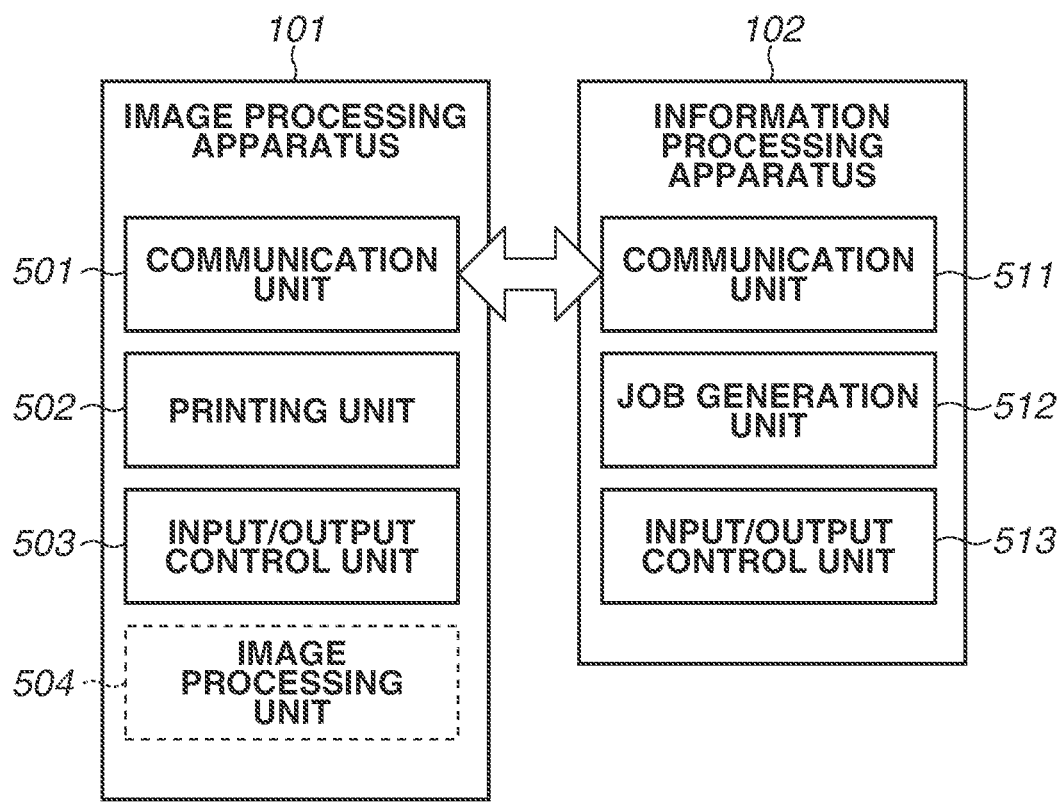
FIG. 5 is a conceptual diagram illustrating software configurations of the image processing apparatus and the information processing apparatus according to the first exemplary embodiment.

Next, the functions of the information processing apparatus 102 and the image processing apparatus 101 in the printing system according to the present exemplary embodiment will be described. FIG. 5 illustrates a software configuration of the printing system according to the present exemplary embodiment. The software configuration is implemented by loading programs stored in the storage devices 305 and 405 of the information processing apparatus 102 and the image processing apparatus 101 into the RAMs 302 and 402 and causing central processing units (CPUs) 301 and 401 to execute the programs, respectively.

The image processing apparatus 101 includes a communication unit 501, a printing unit 502, and an input/output control unit 503. The communication unit 501 causes the network device 408 to communicate with another apparatus via the network 100. The printing unit 502 executes a print job in the image processing apparatus 101 and causes the printing device 404 to output a print product.

The input/output control unit 503 controls information input from the input device 406 and information to be output to the display device 407. The information processing apparatus 102 includes a communication unit 511, a job generation unit 512, and an input/output control unit 513. The communication unit 511 implements communication with another apparatus via the network 100.

The job generation unit 512 generates print data interpretable by the image processing apparatus 101 as a print job. The input/output control unit 513 controls information input from the input device 306 and information to be output to the display device 307.

While the image processing apparatus 101 according to the present exemplary embodiment has been described as including the image processing circuit 409 as a block of the image processing apparatus 101, the image processing apparatus 101 may include an image processing unit 504 as a function of the image processing apparatus 101 as indicated by a dotted line in FIG. 5. In this case, the CPU 401 causes the image processing unit 504 to perform image processing.

Alternatively, the image processing circuit 409 or the image processing unit 504 serving as an image processing function may be included in the information processing apparatus 102.

Next, a print settings user interface (UI) 600 of a printer driver will be described with reference to FIGS. 6A and 6B. The print settings UI 600 is used by the information processing apparatus 102 to transmit a print job to the image processing apparatus 101.

The print settings UI 600 includes function tabs 601 to 603. Because the printer driver has a wide variety of functions, the function tabs 601 to 603 are displayed so that print settings are made on different screens depending on the type of function. Print settings (described below) do not necessarily need to be sorted on the function tabs 601 to 603 as described above. Alternatively, all the print settings may be sorted on the same function tab.

Figure 6A:
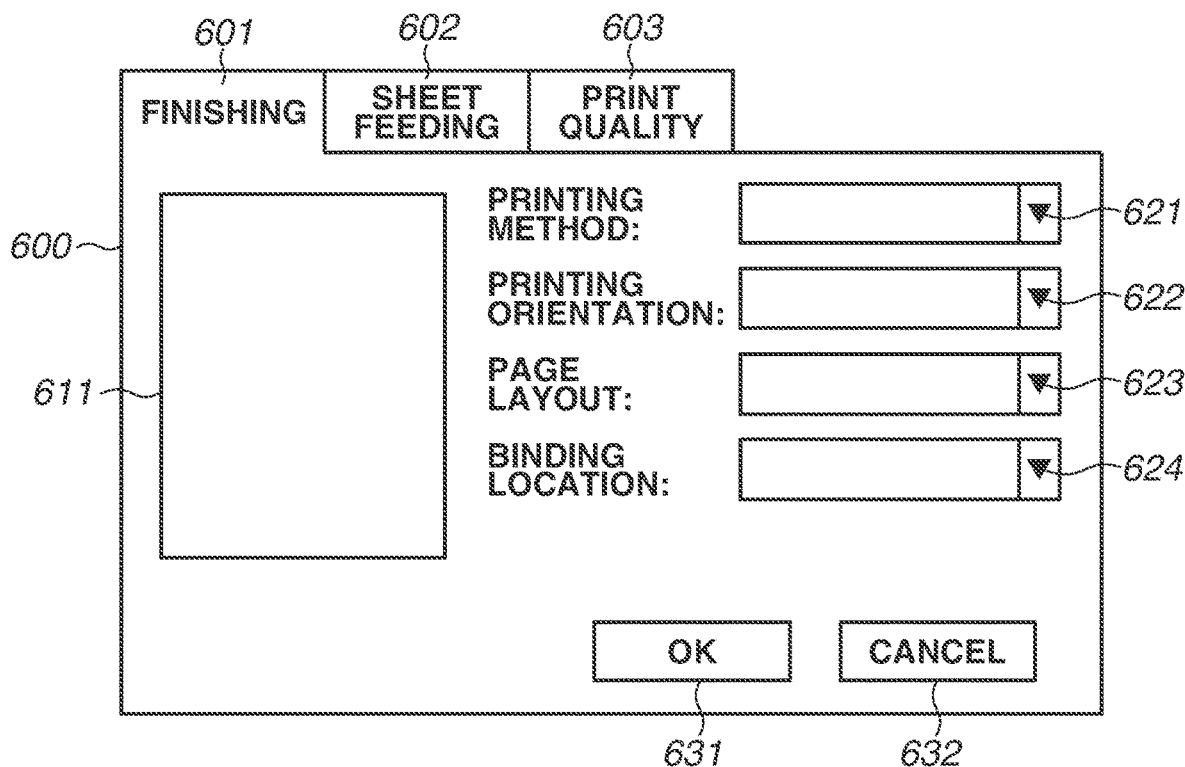
FIGS. 6A and 6B are diagrams illustrating a printer driver screen according to the first exemplary embodiment.

FIG. 6A illustrates the print settings UI 600 where the "Finishing" tab 601 is selected as a function tab. In the "Finishing" tab 601, settings regarding imposition processing in printing can be made. A preview 611 visualizes, in a schematic or reduced manner, an output result to be obtained with the current print settings.

In a printing method selection section 621, any of "1-sided Printing", "2-sided Printing", and "Bookbinding Printing" can be selected. In a printing orientation selection section 622, either of "Portrait" and "Landscape" can be selected. In a page layout selection section 623, the number of pages to be aggregated as imposition can be selected. In this example, in the page layout selection section 623, the user can select "1 in 1", "2 in 1", or "4 in 1", and also select a poster printing function (hereinafter referred to as poster printing) from among "Poster (2×2)", "Poster (3×3)", and "Poster (4×4)". In a binding location selection section 624, which edge of the sheet is to be bound can be selected. In this example, in the binding location selection section 624, "Long Edge" or "Short Edge" can be selected.

Figure 6B:
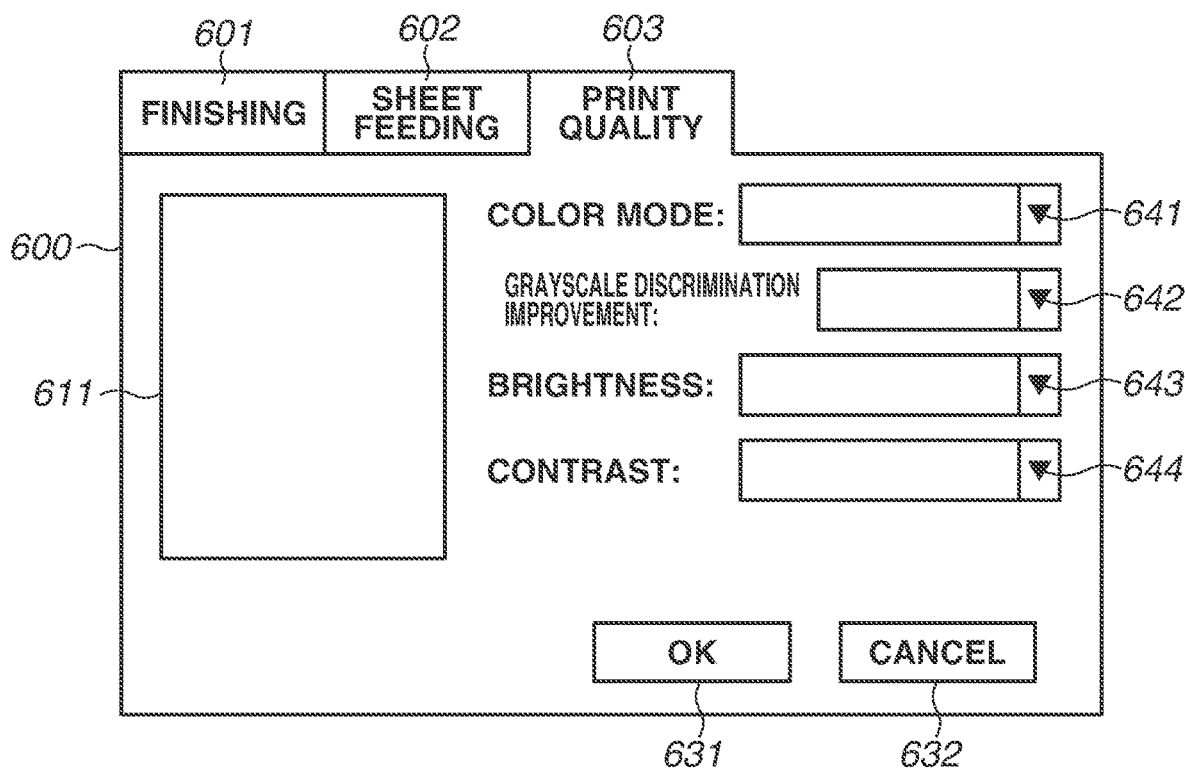

FIG. 6B illustrates the print settings UI 600 where the "Print Quality" tab 603 is selected as a function tab. In the "Print Quality" tab 603, settings regarding the print quality in printing can be made.

In a color mode selection section 641, either of "Color" and "Grayscale" can be selected. In a grayscale discrimination improvement function selection section 642 (hereinafter also referred to as a function selection section 642), in a case where the user selects "Grayscale" in the color mode selection section 641, the user can select whether to apply a function for improving discrimination of colors in grayscale mode (hereinafter referred to as a grayscale discrimination improvement function).

In the function selection section 642, either "Do Not Use" or "Correct Density" (hereinafter also referred to as density correction) can be selected. In a brightness selection section 643 and a contrast selection section 644, the brightness and the contrast in output can be adjusted, respectively.

The grayscale discrimination improvement function selection section 642 is enabled if "Grayscale" is selected in the color mode selection section 641.

Pressing an OK button 631 starts processing (job generation processing) for generating a print job in which the settings made on the print settings UI 600 are reflected. The generated print job is transmitted to the image processing apparatus 101 via the network device 308. On the other hand, pressing a Cancel button 632 cancels the print settings.

Figure 7:
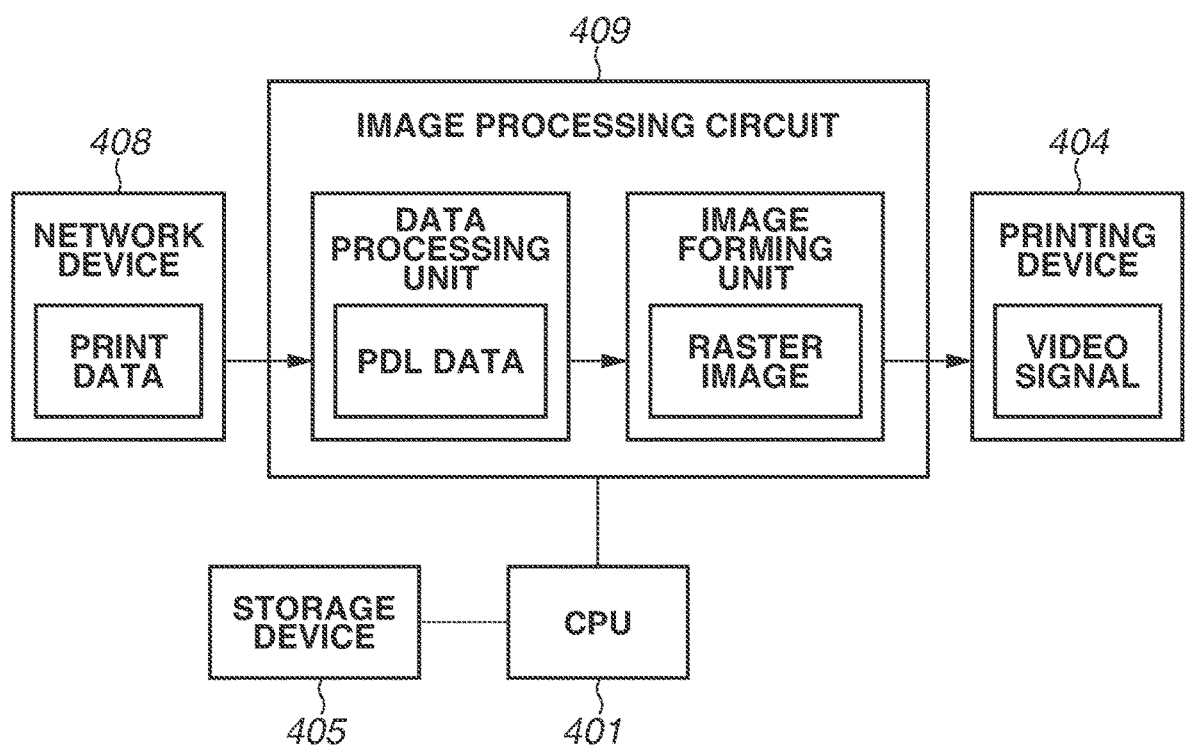
FIG. 7 is a conceptual diagram illustrating a module configuration of the image processing apparatus according to the first exemplary embodiment.

FIG. 7 illustrates a module configuration of the image processing apparatus 101 according to the present exemplary embodiment.

The network device 408 receives print data. The image processing circuit 409 analyzes the received print data as page description language data (hereinafter referred to as PDL data). Based on the analyzed PDL data, the image processing circuit 409 generates a raster image. The image processing circuit 409 converts the generated image into a video signal and outputs the video signal to the printing device 404. At this time, the modules 404, 408, and 409 may be included in the information processing apparatus 102 or may be included in the image processing apparatus 101.

Next, with reference to FIG. 8, a description will be given of a general overview of an analysis that is performed to generate image data for printing after the network device 408 of the image processing apparatus 101 receives print data.

The CPU 401 causes the image processing circuit 409 to perform the processing of FIG. 8 using a program and data read from the storage device 405.

When the network device 408 receives print data, the flowchart illustrated in FIG. 8 is started.

In step S801, the CPU 401 causes the image processing circuit 409 to acquire a print job received by the network device 408.

In step S802, the CPU 401 causes a job analysis unit in the image processing circuit 409 to analyze the received print job. The CPU 401 confirms setting information included in the header of the print job. The setting information is, for example, the printing method, the printing orientation, the page layout, the binding location, the color mode, the on or off state of the grayscale discrimination improvement function, the brightness, and the contrast that are set for the received print job.

The grayscale discrimination improvement function is selectable when "Grayscale" is selected in the color mode selection section 641. In a case where input color data represented by colors in an RGB format is to be output in "Grayscale" mode, input RGB values are converted to grayscale using a predetermined conversion formula to generate output data.

The grayscale discrimination improvement function is processing for converting the colors included in a page so that the gray values of the respective colors are away from each other. For example, "Correct Density" can be selected as the grayscale discrimination improvement function. The "Correct Density" (density correction) option is a correction function for improving the discrimination of colors in grayscale.

In step S803, the CPU 401 causes a page analysis unit in the image processing circuit 409 to perform data analysis on a page-by-page basis. Accordingly, the CPU 401 acquires R, G, and B values included in each page.

Next, in step S804, the CPU 401 performs a color-to-gray conversion analysis based on the R, G, and B values. If "Correct Density" is disabled, the CPU 401, for example, analyzes the colors in the page and converts the colors to grayscale to create a conversion table. At this time, the gray values are not corrected. FIG. 9A illustrates an example of a conversion table 901 that is created in a case where "Correct Density" is disabled. In this example, four colors are included in the page. In the analysis processing on the colors in the page, the image processing circuit 409 performs color-to-gray conversion on a pixel-by-pixel basis. More specifically, first, each of R, G, and B is weighted for each color using a predetermined coefficient to calculate the gray value of the color, and then the calculated gray value is inverted and changed to a density signal.

If "Correct Density" is enabled, the CPU 401, for example, analyzes the colors in the page and creates a conversion table for converting the colors so that the gray values of the respective colors after grayscale conversion are away from each other. FIG. 9B illustrates an example of a conversion table 902 that is created in a case where the density correction is made.

In this case, in the analysis processing on the colors in the page, the image processing circuit 409 performs color-to-gray conversion on a pixel-by-pixel basis. More specifically, first, each of R, G, and B is weighted for each color using a predetermined coefficient to calculate the gray value of the color. Next, the calculated gray values corresponding to the respective colors are corrected so that there is a predetermined difference between the gray values. Then, each of the corrected gray values is inverted and changed to a density signal.

In step S805, the CPU 401 performs color-to-gray conversion processing based on information (conversion table) regarding the analyzed colors.

In step S806, the CPU 401 causes the printing device 404 to form an image to be used in printing.

In step S807, the CPU 401 determines whether the formation of the image to be used in printing is completed for all the pages. If the formation of the image to be used in printing is completed for all the pages (YES in step S807), the processing ends. If the formation of the image to be used in printing is not completed for all the pages (NO in step S807), the processing returns to step S803. The analysis of image data (e.g., the formation of the image for the second page) and the printing of the formed image on a sheet by the printing device 404 (e.g., the printing of the image for the first page on a sheet) may be performed in parallel.

An issue of the present exemplary embodiment will be described with reference to FIGS. 10A to 10D, 11A, and 11B.

FIGS. 10A to 10D illustrate schematic diagrams each illustrating a product that is output when a bookbinding printing function (hereinafter referred to as bookbinding printing) is specified in the printing method selection section 621 of FIG. 6A (i.e., when the setting of bookbinding printing is included in the print job described with reference to FIG. 8).

FIG. 10A is a schematic side view of a product that is output when 12-page data is subjected to bookbinding printing. Numbers illustrated in FIG. 10A indicate the page numbers of pages printed on the surfaces of sheets of the product. FIG. 10C illustrates the page numbers of the pages printed on the front and back sides of the sheets of the product that is output when 12-page data is subjected to bookbinding printing as illustrated in FIG. 10A.

Similarly, FIG. 10B is a schematic side view of a product that is output when 7-page data is subjected to bookbinding printing. FIG. 10D illustrates the page numbers of pages printed on the front and back sides of sheets of the product illustrated in FIG. 10B when 7-page data is subjected to bookbinding printing. In a product output by bookbinding printing, two consecutive pages in the original print data are simultaneously viewed as a double-page spread.

If "Do Not Use" is selected in the grayscale discrimination improvement function selection section 642 of FIG. 6B, the RGB values of input color image data are converted to grayscale using a predetermined conversion formula to generate output data. In this case, two colors different in the original RGB values may become the same or close as a result of the grayscale conversion. However, because the grayscale conversion is performed on a color-by-color basis, colors that are the same in different pages before the conversion remain the same also in grayscale.

On the other hand, if "Correct Density" is selected in the function selection section 642, colors and the number of colors (the types of colors) in each page are analyzed to create a conversion table for converting the colors so that the gray values of the respective colors after grayscale conversion are away from each other. Then, using a different conversion table for each page, the colors are converted to grayscale on a page-by-page basis to generate output data, and printing is performed based on the generated data.

In other words, because colors and the number of colors are analyzed on a page-by-page basis, if a layout for bookbinding that presents different pages as a double-page spread is used as in bookbinding printing, colors that are the same in different pages before the conversion may become different if converted to grayscale.

More specifically, in an example of bookbinding illustrated in FIG. 10A, in the case of the under surface of the first output sheet from the top (as seen from in FIG. 10A), a combination of the fifth and eighth pages of input data is an analysis target. In the case of the top surface of the second output sheet from the top (as seen from FIG. 10A), a combination of the fourth and ninth pages of the input data is an analysis target. As a result, when the fourth and fifth pages of the input data are viewed as a double-page spread, portions originally represented by colors having the same RGB values may be conspicuously represented by different grayscale values, and this may result in a final output product having an unnatural appearance.

Figure 11A:
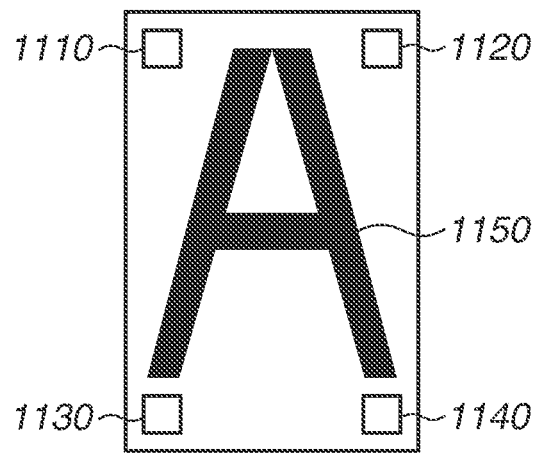
FIGS. 11A and 11B are schematic diagrams illustrating poster printing according to the first exemplary embodiment.
Figure 11B:
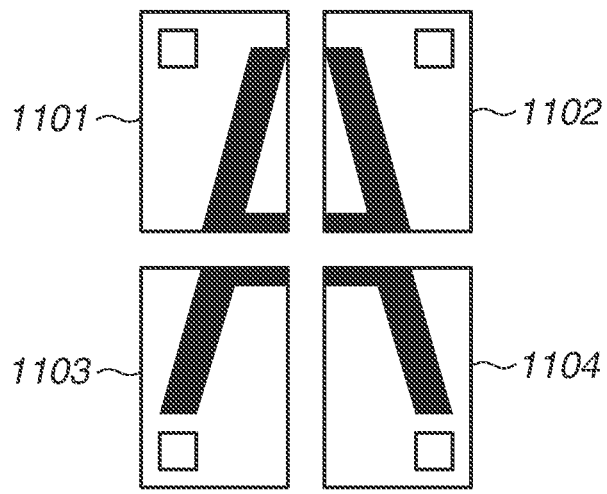

FIGS. 11A and 11B schematically illustrate products that are output when poster printing is specified in the page layout selection section 623 of FIG. 6A (when the setting of poster printing is included in the print job described with reference to FIG. 8).

FIG. 11A illustrates image data to be output. The image data according to the present exemplary embodiment includes four squares 1110, 1120, 1130, and 1140 and a letter "A" 1150. In FIG. 11A, the four squares 1110, 1120, 1130, and 1140 and the letter "A" 1150 are drawn in different colors from each other.

FIG. 11B illustrates products that are output when "Poster (2×2)" is specified in the page layout selection section 623. At this time, the information processing apparatus 102 divides a single piece of image data into a plurality of pieces of image data, generates different print jobs for the respective pieces of image data, and transmits the print jobs. In other words, FIG. 11B illustrates the result of the image processing apparatus 101 receiving and executing the different print jobs. In a case where the user wishes to make a poster from a single page image, poster printing allows the user to divide the single page into a plurality of pages and print these pages on a plurality of sheets, so that the user can make a poster by joining the sheets together.

In an example of poster printing illustrated in FIG. 11B, in the case of image data 1101 (of the first page) to be printed first, the square 1110 at the upper left (in red, for example) and a part of the letter "A" 1150 (in blue, for example) are to be analyzed.

In the case of image data 1102 (of the second page) to be printed second, the square 1120 at the upper right (in green, for example) and a part of the letter "A" 1150 (in blue, for example) are to be analyzed.

Thus, similarly to the example of FIGS. 10A to 10D, in the example of FIGS. 11A and 11B, if "Do Not Use" is selected in the function selection section 642, the color of the letter "A" 1150 in the image data 1101 and the color of the letter "A" 1150 in the image data 1102 remain the same also in grayscale. Accordingly, the color of the letter "A" 1150 on a product output by printing the image data 1101 on a sheet and the color of the letter "A" 1150 on a product output by printing the image data 1102 on a sheet are the same.

On the other hand, in a case where "Correct Density" is selected in the function selection section 642, the CPU 401 analyzes colors individually for each of the image data 1101 and the image data 1102 (i.e., on a page-by-page basis). Then, for each of the image data 1101 and the image data 1102 (i.e., for each page), the CPU 401 creates a conversion table for converting the colors so that the gray values of the respective colors after grayscale conversion are away from each other. Then, using a different conversion table for each of the image data 1101 and the image data 1102, the colors are converted to grayscale on an image data basis to generate output data, and printing is performed based on the generated data.

Thus, in a case where a single print product is produced by printing a plurality of pages on a plurality of sheets and joining the sheets together as in poster printing, colors that are the same in different pages before the conversion may become different from each other if converted to grayscale. As a result, the parts of the letter "A" 1150 originally represented by the colors having the same RGB values may be represented by different grayscale values, and this may result in a final output product having an unnatural appearance.

Figure 12:
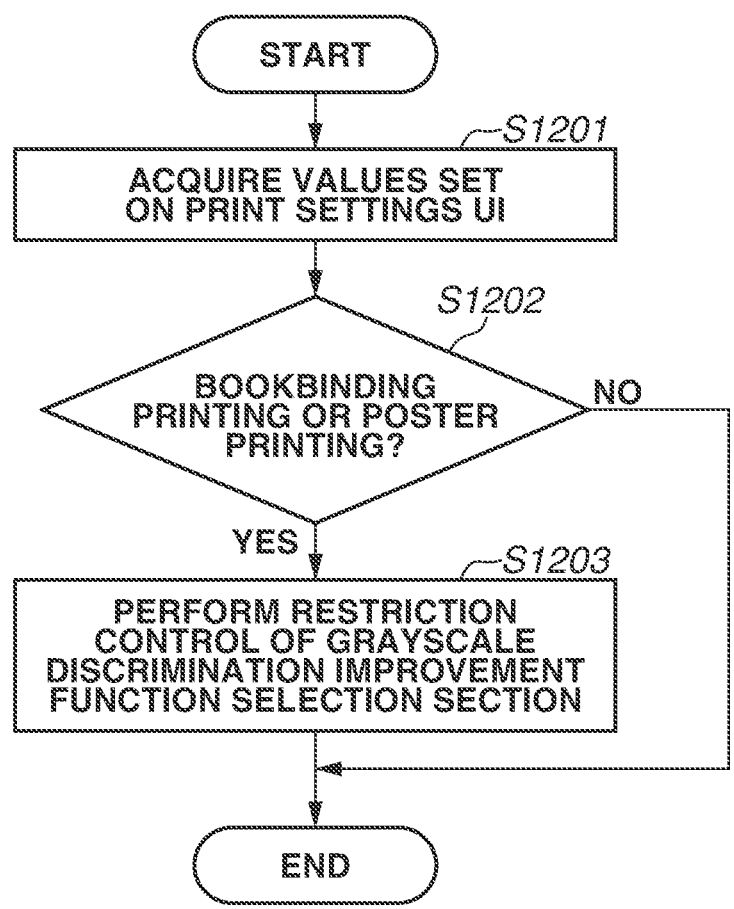
FIG. 12 is a flowchart illustrating processing for determining printer driver restriction control according to the first exemplary embodiment.

To solve the issue that arises when a plurality of output products is treated as a final output product as described above, in the present exemplary embodiment, the CPU 301 of the information processing apparatus 102 performs processing for determining UI restriction control illustrated in a flowchart of FIG. 12.

The flowchart of FIG. 12 illustrates the processing for determining the printer driver restriction control (UI restriction control), which is performed by the information processing apparatus 102 according to the present exemplary embodiment. The CPU 301 of the information processing apparatus 102 performs this processing by using a program read from the ROM 303 and held in the RAM 302.

The processing for determining the UI restriction control illustrated in the flowchart of FIG. 12 is started when any of the values set on the print settings UI 600 is changed. Alternatively, the processing may be started when any of the values set in the printing method selection section 621, the page layout selection section 623, and the grayscale discrimination improvement function selection section 642, which are related to the restriction control, is changed.

In step S1201, the information processing apparatus 102 acquires the values set on the print settings UI 600. In step S1202, the information processing apparatus 102 determines whether the value set in the printing method selection section 621 is "Bookbinding Printing", the value set in the page layout selection section 623 is poster printing, or neither of "Bookbinding Printing" and poster printing is set. The poster printing corresponds to, for example, "Poster (2×2)", "Poster (3×3)", or "Poster (4×4)".

If it is determined in step S1202 that the value set in the printing method selection section 621 is "Bookbinding Printing", or the value set in the page layout selection section 623 is poster printing (YES in step S1202), the processing proceeds to step S1203. In step S1203, the information processing apparatus 102 performs the restriction control of the function selection section 642.

Figure 13A:
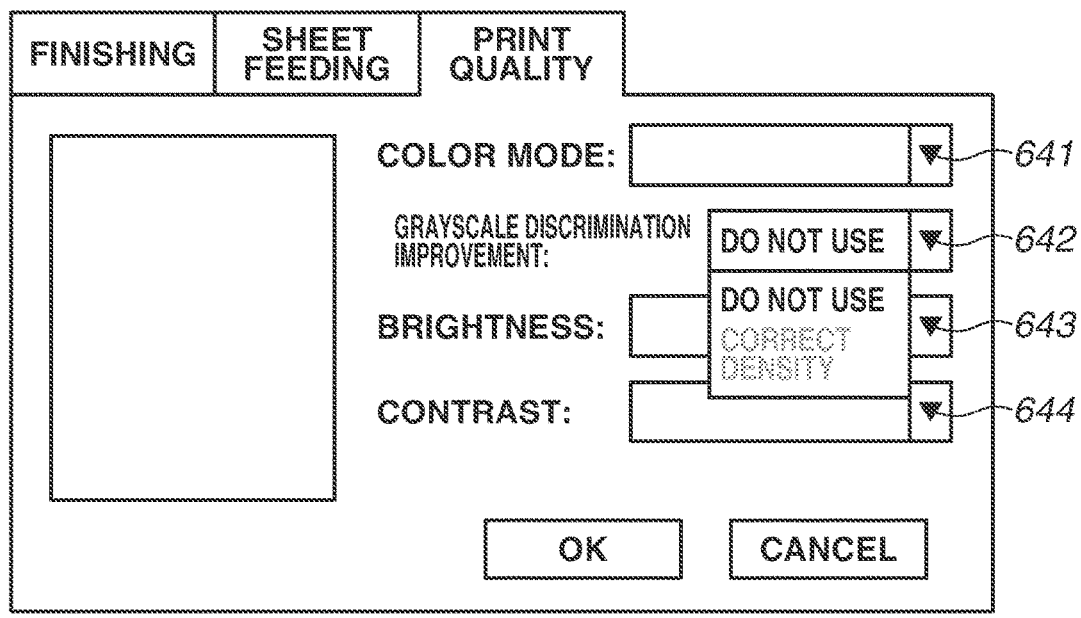
FIGS. 13A to 13D are diagrams illustrating another examples of the printer driver screen according to the first exemplary embodiment.

FIG. 13A illustrates an example of the restriction control in step S1203. If "Bookbinding Printing" is set in the printing method selection section 621, or poster printing is set in the page layout selection section 623 before a setting is made in the function selection section 642, the "Correct Density" option is grayed out to be unselectable. If "Bookbinding Printing" or poster printing is set after "Correct Density" is set in the function selection section 642, the value set in the function selection section 642 is changed to "Do Not Use", and the "Correct Density" option is grayed out to be unselectable.

Next, examples of the restriction control method other than the grayed-out display will be described. Restriction control methods including the grayed-out display described above may be combined, if possible.

Figure 13B:
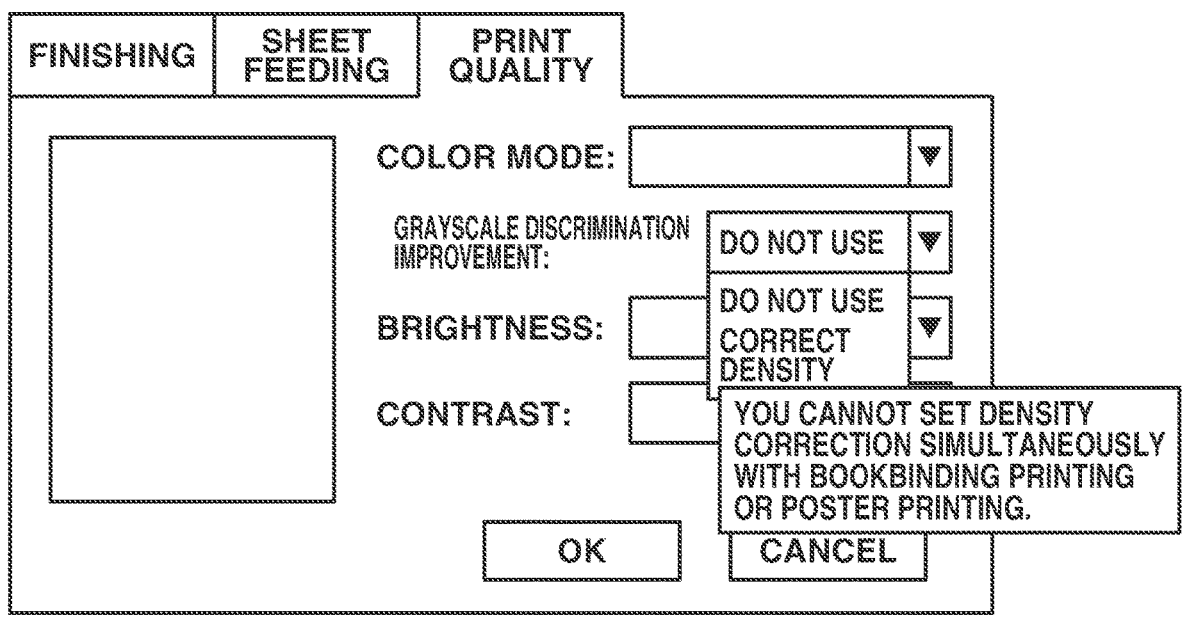

As another example of the restriction control method, as illustrated in FIG. 13B, a tooltip indicating that "Correct Density" is unselectable is displayed in the grayscale discrimination improvement function selection section 642.

Figure 13C:
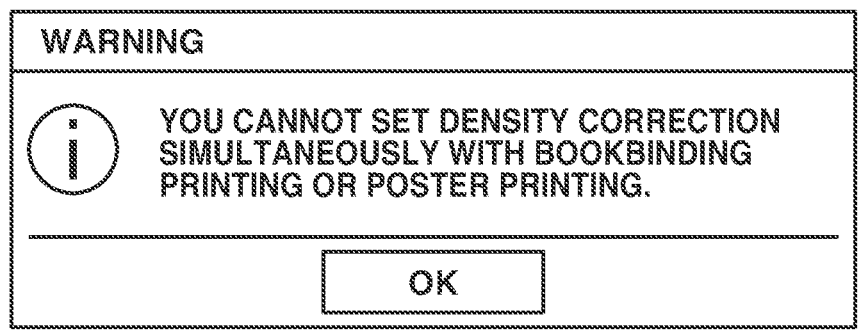

As yet another example of the restriction control method, as illustrated in FIG. 13C, a message indicating that "Correct Density" is unselectable is displayed in the function selection section 642.

Figure 13D:
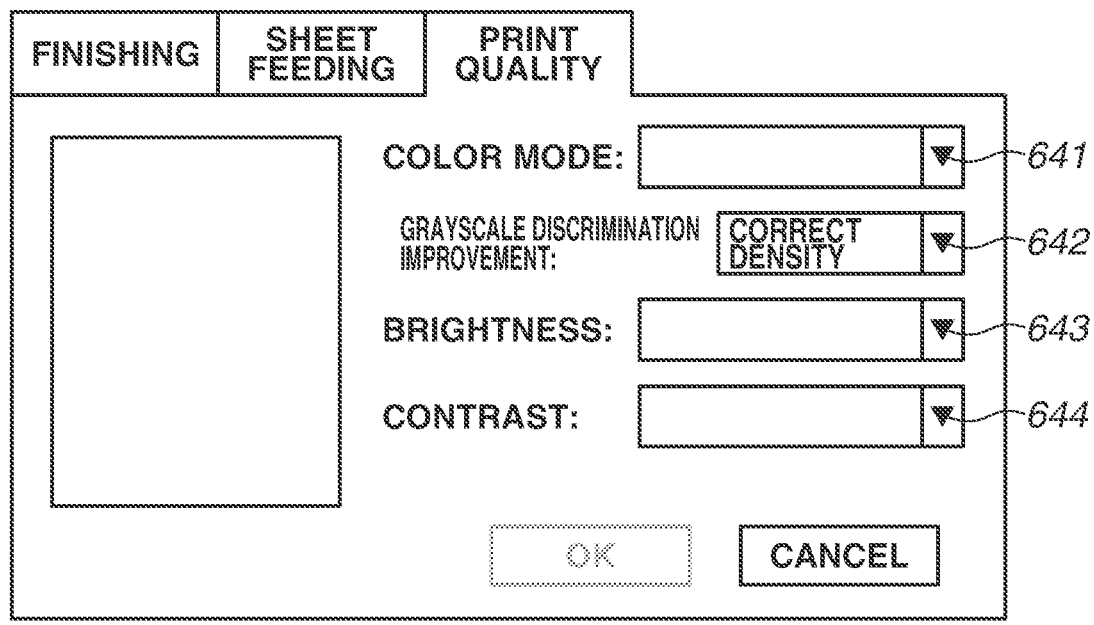

As yet another example of the restriction control method, in a case where the value set in the grayscale discrimination improvement function selection section 642 is "Correct Density", a message or a tooltip indicating that "Correct Density" cannot be selected simultaneously with "Bookbinding Printing" or poster printing is displayed in the function selection section 642. Then, the value set in the printing method selection section 621 or the page layout selection section 623 is returned to the value before being changed. As yet another example of the restriction control method, as illustrated in FIG. 13D, the OK button 631 is grayed out so that the OK button 631 cannot be pressed as long as "Correct Density" is selected in the grayscale discrimination improvement function selection section 642.

In any of the restriction control methods, if the value set in the printing method selection section 621 is "Bookbinding Printing", or the value set in the page layout selection section 623 is poster printing, the "Correct Density" option is unselectable in the grayscale discrimination improvement function selection section 642.

Now, the description returns to the flowchart of FIG. 12. If, on the other hand, it is determined in step S1202 that the value set in the printing method selection section 621 is not "Bookbinding Printing", and the value set in the page layout selection section 623 is not poster printing (NO in step S1202), the processing ends. In other words, the information processing apparatus 102 does not perform the restriction control of the function selection section 642.

Figure 14:
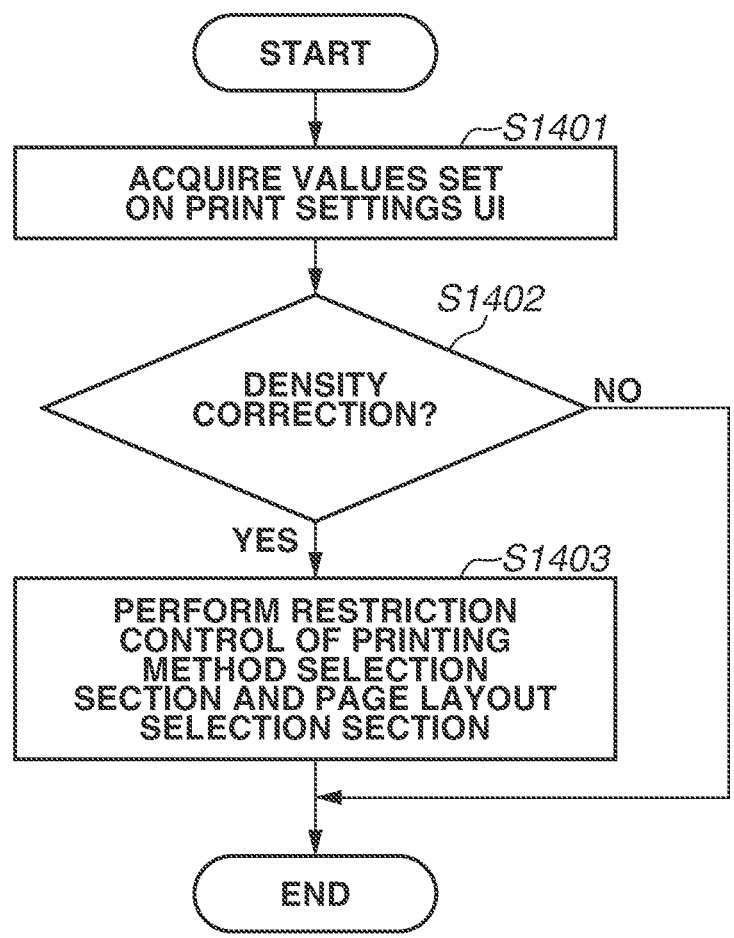
FIG. 14 is a flowchart illustrating another example of the processing for determining the printer driver restriction control according to the first exemplary embodiment.

Next, the processing for determining the printer driver restriction control (UI restriction control) will be described with reference to FIG. 14. FIG. 14 is a flowchart illustrating another example of the processing for determining the printer driver restriction control illustrated FIG. 12. The processing is performed by the CPU 301 of the information processing apparatus 102 using a program read from the ROM 303 and held in the RAM 302. The start timing of the processing illustrated in FIG. 14 is the same as that in FIG. 12.

In step S1401, the information processing apparatus 102 acquires the values set on the print settings UI 600. In step S1402, the information processing apparatus 102 determines whether the value set in the grayscale discrimination improvement function selection section 642 is "Correct Density".

If it is determined in step S1402 that the value set in the grayscale discrimination improvement function selection section 642 is "Correct Density" (YES in step S1402), the processing proceeds to step S1403.

In step S1403, the information processing apparatus 102 performs the restriction control of the printing method selection section 621 and the page layout selection section 623.

Figure 15A:
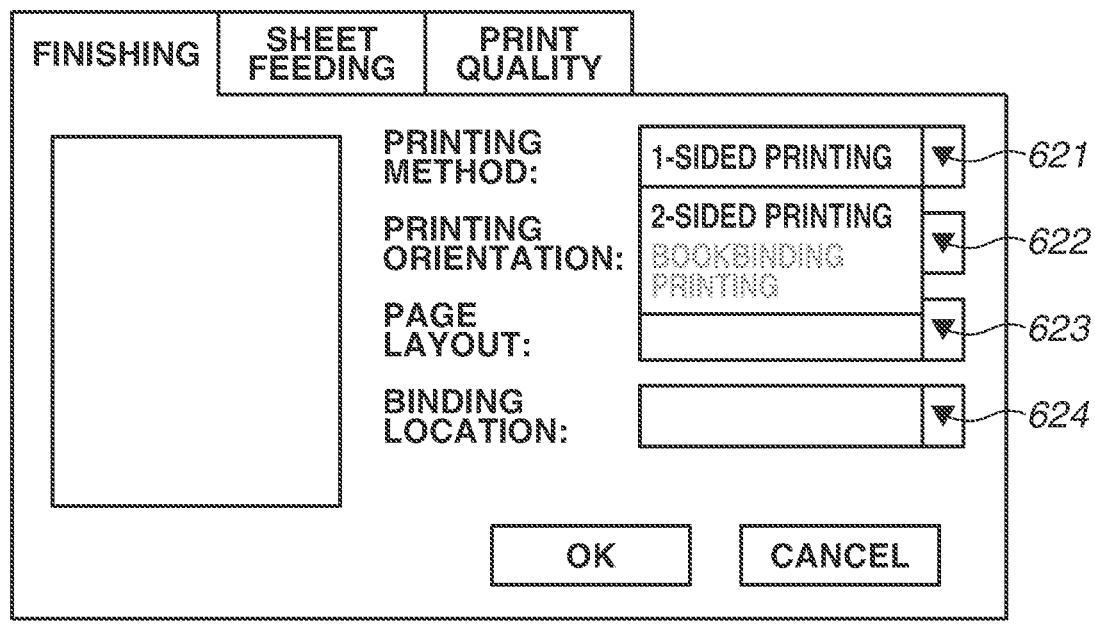
FIGS. 15A to 15E are diagrams illustrating yet another examples of the printer driver screen according to the first exemplary embodiment.

As an example of the restriction control in step S1403, if "Correct Density" is selected in the function selection section 642 before a setting is made in the printing method selection section 621, the "Bookbinding Printing" option is grayed out to be unselectable (as illustrated in FIG. 15A). If "Correct Density" is selected after "Bookbinding Printing" is set in the printing method selection section 621, the value set in the printing method selection section 621 is changed to "1-sided Printing", and the "Bookbinding Printing" is grayed out to be unselectable (as illustrated in FIG. 15A).

Figure 15B:
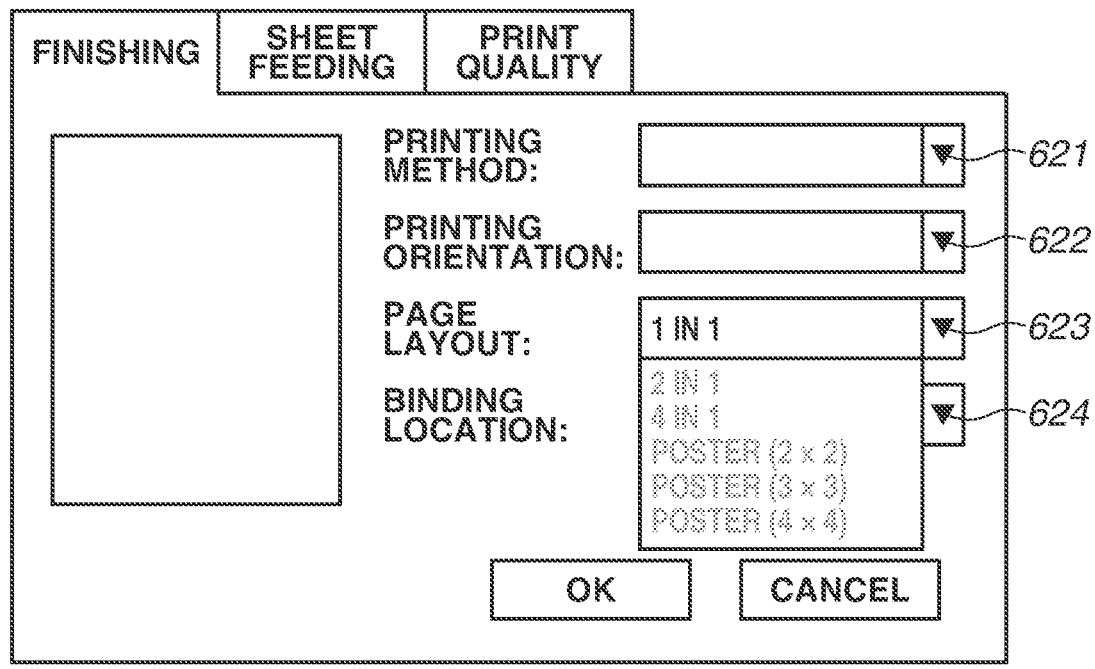

If "Correct Density" is selected in the function selection section 642 before a setting is made in the page layout selection section 623, the "Poster" options are grayed out to be unselectable (as illustrated in FIG. 15B). If "Correct Density" is selected after poster printing is set in the page layout selection section 623, the value set in the page layout selection section 623 is changed to "1 in 1", and the "Poster" options are grayed out to be unselectable (as illustrated in FIG. 15B).

Next, examples of the restriction control method other than the grayed-out display will be described. Restriction control methods including the grayed-out display described above may be combined.

Figure 15C:
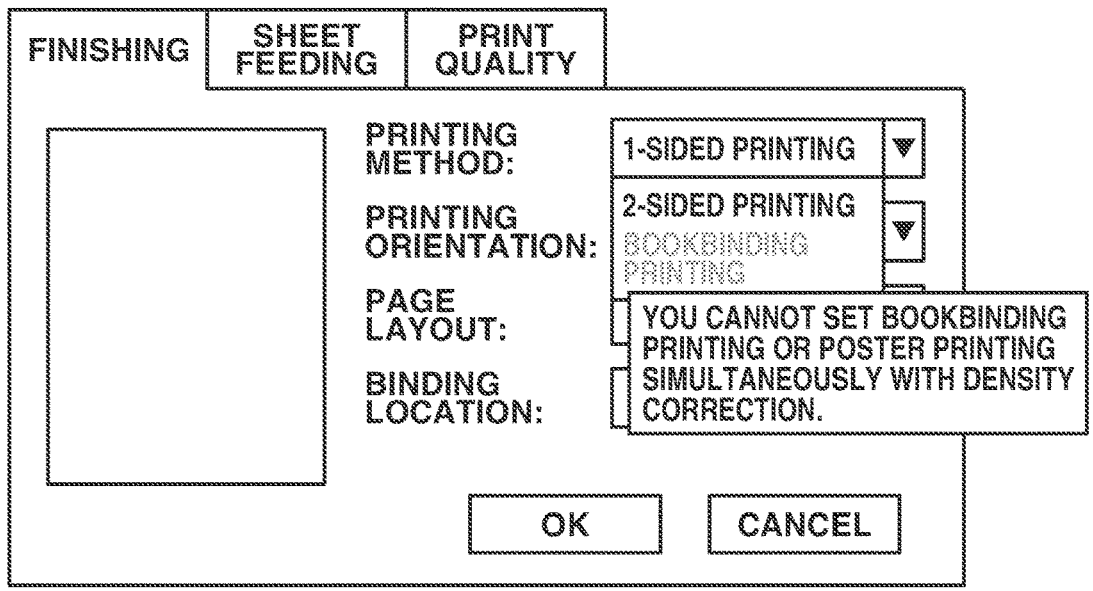
Figure 15D:
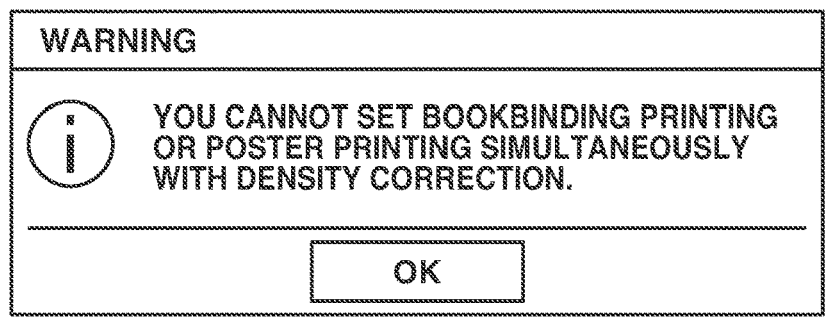

As another example of the restriction control method, as illustrated in FIGS. 15C and 15D, a message or a tooltip indicating that "Bookbinding Printing" or poster printing cannot be set simultaneously with "Correct Density" is displayed.

Figure 15E:
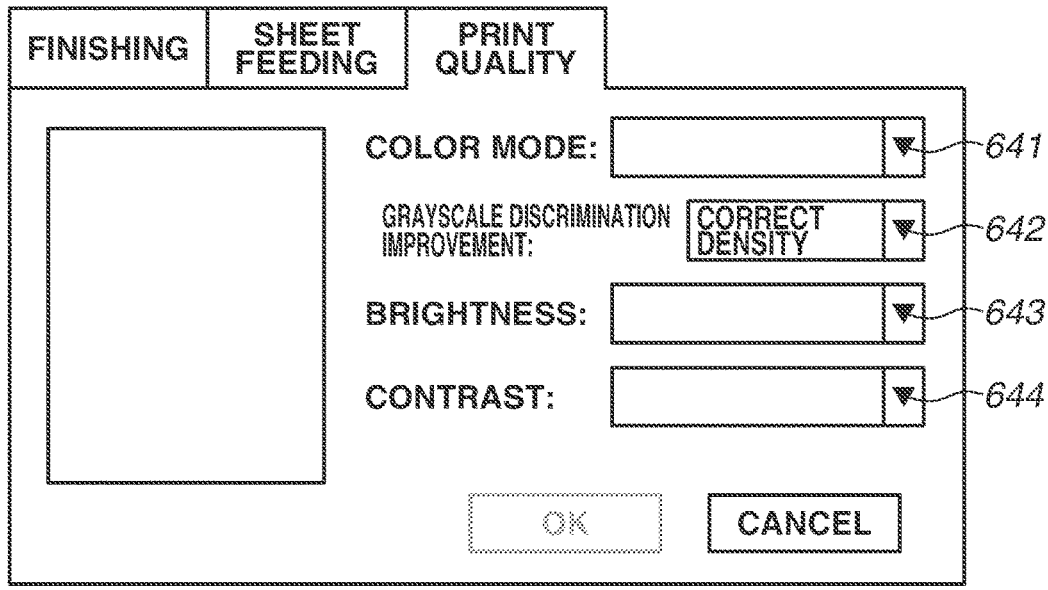

As yet another example of the restriction control method, as illustrated in FIG. 15E, the OK button 631 is grayed out as long as the value set in the printing method selection section 621 is "Bookbinding Printing", or the value set in the page layout selection section 623 is poster printing.

In any of the restriction control methods, if the value set in the function selection section 642 is "Correct Density", the state where the "Bookbinding Printing" option is unselectable in the printing method selection section 621, and the "Poster" options are unselectable in the page layout selection section 623 is maintained.

If, on the other hand, it is determined in step S1402 that the value set in the grayscale discrimination improvement function selection section 642 is not "Correct Density" (NO in step S1402), the information processing apparatus 102 does not perform the restriction control of the printing method selection section 621 or the restriction control of the page layout selection section 623.

According to the present exemplary embodiment, by using the processing for determining the UI restriction control, it is possible to restrict the simultaneous setting of the grayscale discrimination improvement function and bookbinding printing or poster printing. As a result, it is possible to prevent the situation where, when color conversion processing that produces different grayscale conversion results for pages having different feature amounts is performed, portions originally having the same colors are converted to grayscale values having different densities and this results in a final output product having an unnatural appearance.

In a second exemplary embodiment, a configuration in which the functions of a plurality of image processing apparatuses are different from each other will be described. Hereinafter, a configuration in which the image processing apparatus 101 has the grayscale discrimination improvement function and an image processing apparatus 103 does not have the grayscale discrimination improvement function will be described as an example. In addition, regarding the image processing apparatus 101, a case where the image processing apparatus 101 has a function capable of, when colors in a page are analyzed to create a grayscale conversion table, analyzing consecutive pages as a target to create a conversion table common to the consecutive pages, and a case where the image processing apparatus 101 does not have this function will be described.

It is assumed here that a printer driver according to the present exemplary embodiment can be used in common by the image processing apparatuses 101 and 103.

Figure 16:
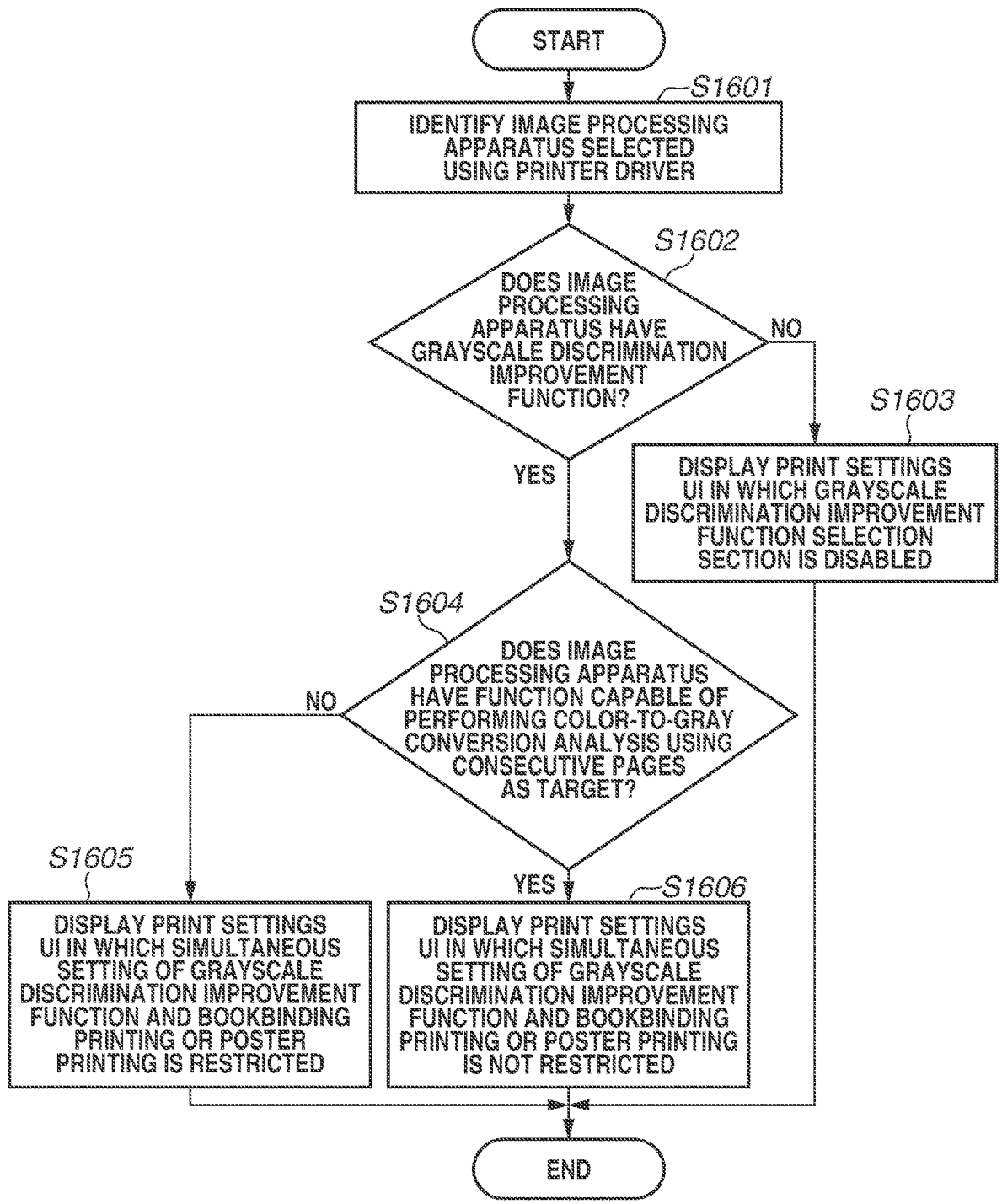
FIG. 16 is a flowchart illustrating control for displaying print settings of a printer driver according to a second exemplary embodiment.

FIG. 16 is a flowchart illustrating control for displaying the print settings UI 600 of the printer driver according to the present exemplary embodiment. The control is performed by the CPU 301 of the information processing apparatus 102 using a program read from the ROM 303 and held in the RAM 302.

In the present exemplary embodiment, when the printer driver for the image processing apparatuses 101 and 103 is installed, the information processing apparatus 102 acquires function information regarding each of the image processing apparatuses 101 and 103 via the network 100 and stores the function information in the storage device 305. The stored function information includes capability information regarding the grayscale discrimination improvement function.

The processing in the flowchart of FIG. 16 is started when the print settings UI 600 is displayed.

In step S1601, the CPU 301 identifies an image processing apparatus selected using the printer driver. For example, the user can select, on the printer driver screen, either of the image processing apparatuses 101 and 103 illustrated in FIG. 1. The identified image processing apparatus is the transmission destination of a print job.

In step S1602, the information processing apparatus 102 refers to the function information regarding the identified image processing apparatus to determine whether the selected image processing apparatus has the grayscale discrimination improvement function. If the selected image processing apparatus does not have the grayscale discrimination improvement function (NO in step S1602), the processing proceeds to step S1603. This is the case where the image processing apparatus identified in step S1601 is the image processing apparatus 103.

In step S1603, the information processing apparatus 102 displays the print settings UI 600 on which the grayscale discrimination improvement function selection section 642 is disabled. An example of the print settings UI 600 displayed in this case is that the grayscale discrimination improvement function selection section 642 is hidden in the "Print Quality" tab 603. Another example of the print settings UI 600 displayed in this case is that the function selection section 642 is displayed in the "Print Quality" tab 603, but is always grayed out and disabled.

Now, the description returns to step S1602. If the selected image processing apparatus has the grayscale discrimination improvement function (YES in step S1602), the processing proceeds to step S1604.

This is the case where the image processing apparatus identified in step S1601 is the image processing apparatus 101.

In step S1604, the information processing apparatus 102 determines whether the image processing apparatus 101 has the function capable of performing a color-to-gray conversion analysis using consecutive pages as a target and generating a conversion table common to the consecutive pages.

If it is determined in step S1604 that the image processing apparatus 101 does not have the function capable of performing a color-to-gray conversion analysis using consecutive pages as a target (NO in step S1604), the processing proceeds to step S1605. In step S1605, the information processing apparatus 102 displays the print settings UI 600 on which the function selection section 642 is enabled and the simultaneous setting of the grayscale discrimination improvement function and bookbinding printing or poster printing is restricted. Examples of the print settings UI 600 displayed in this case include the configurations described in the first exemplary embodiment.

If it is determined in step S1604 that the image processing apparatus 101 has the function capable of performing a color-to-gray conversion analysis using consecutive pages as a target (YES in step S1604), the processing proceeds to step S1606.

In step S1606, the information processing apparatus 102 displays the print settings UI 600 on which "Correct Density" is selectable in the function selection section 642 and the simultaneous setting of density correction and bookbinding printing or poster printing is not restricted. Examples of the print settings UI 600 displayed in this case include a configuration in which the grayscale discrimination improvement function can be set regardless of whether bookbinding printing or poster printing is set.

As described above, with the configuration described with reference to FIG. 16, the printer driver UI can be changed depending on whether the image processing apparatus selected using the printer driver has the grayscale discrimination improvement function. Furthermore, if the image processing apparatus has the grayscale discrimination improvement function, the printer driver UI can be changed depending on whether the image processing apparatus has the function capable of analyzing consecutive pages as a target.

Figure 17:
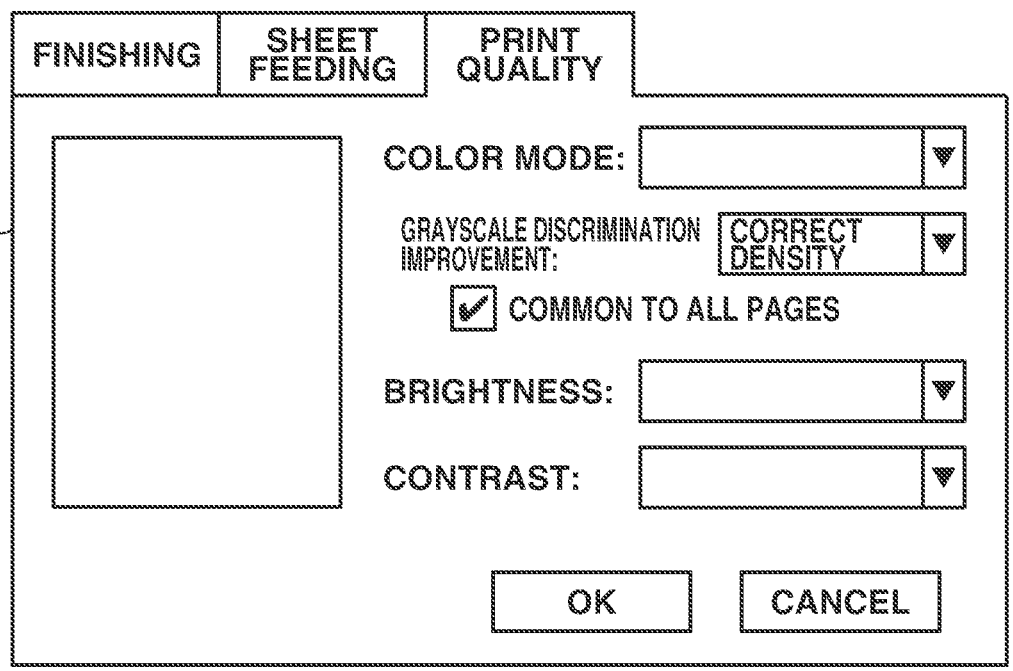
FIG. 17 is a diagram illustrating a printer driver screen according to the second exemplary embodiment.

Determination of the presence or absence of the function capable of analyzing consecutive pages as a target in step S1604 may be made based on a setting on a printer driver screen 1700 illustrated in FIG. 17. For example, if "Common to All Pages" illustrated in FIG. 17 is checked, the processing proceeds to step S1606, and if "Common to All Pages" illustrated in FIG. 17 is not checked, the processing proceeds to step S1605. An example of a configuration in which the printer driver screen 1700 is switched while being displayed is illustrated in FIG. 17, but the present exemplary embodiment is not limited thereto.

Figure 18:
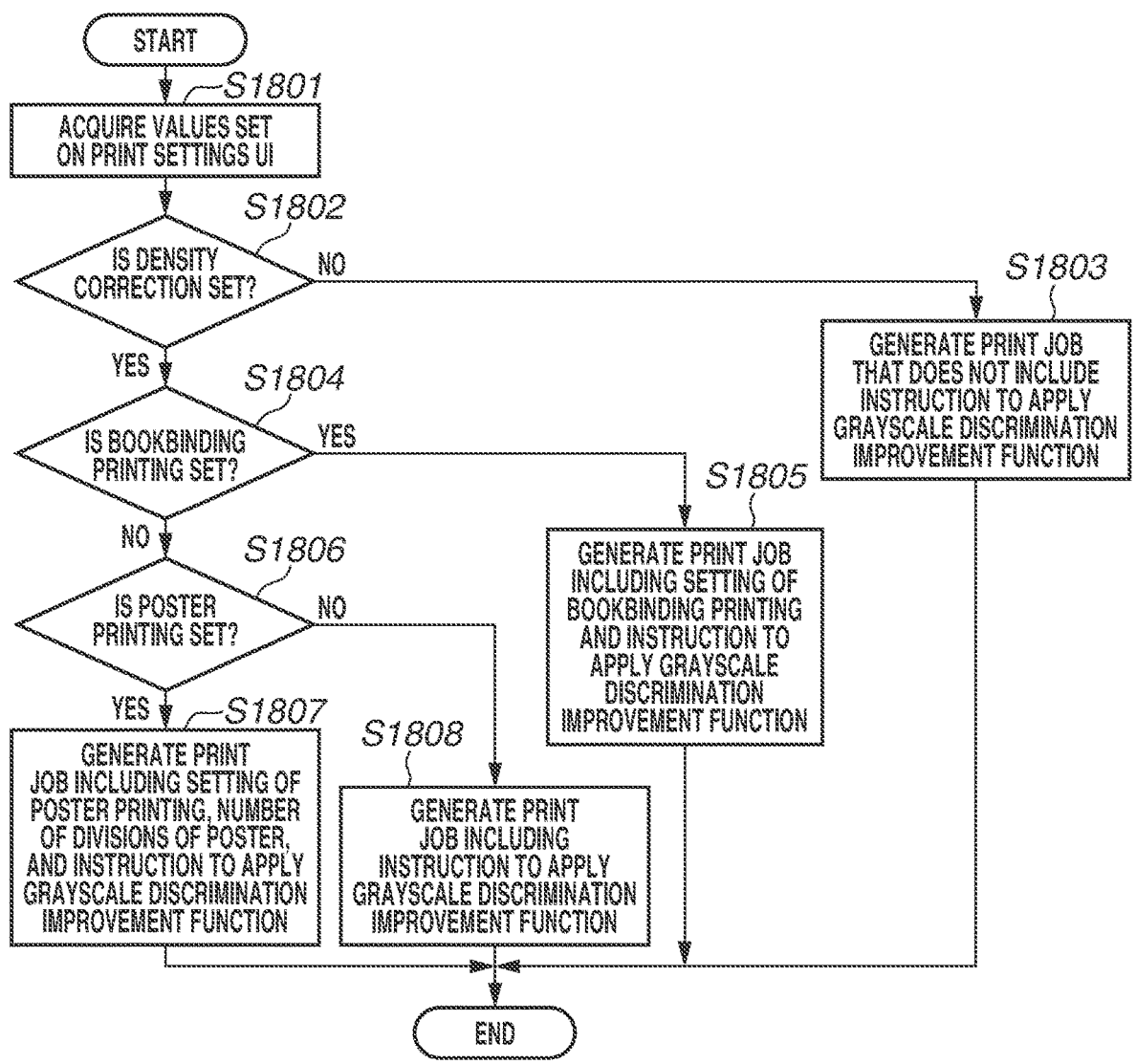
FIG. 18 is a flowchart illustrating processing for generating a print job according to the second exemplary embodiment.

Next, with reference to a flowchart illustrated in FIG. 18, a description will be given of processing for generating a print job in a case where the OK button 631 is pressed after the grayscale discrimination improvement function is set via the print settings UI 600 of the printer driver according to the present exemplary embodiment.

The print job includes, for example, print setting information including the setting of density correction made in the function selection section 642, the setting of poster printing made in the page layout selection section 623, and the setting of bookbinding printing made in the printing method selection section 621, and image data.

In step S1801, the information processing apparatus 102 acquires the values set on the print settings UI 600. In step S1802, the information processing apparatus 102 determines whether "Correct Density" is selected in the function selection section 642.

If it is determined in step S1802 that "Correct Density" is selected in the function selection section 642 (YES in step S1802), the processing proceeds to step S1804.

In step S1804, the information processing apparatus 102 determines whether "Bookbinding Printing" is selected in the printing method selection section 621. If it is determined in step S1804 that "Bookbinding Printing" is selected in the printing method selection section 621 (YES in step S1804), the processing proceeds to step S1805.

In step S1805, the information processing apparatus 102 generates a print job including the setting of bookbinding printing and the setting of density correction as the grayscale discrimination improvement function. The information processing apparatus 102 transmits the generated print job to the image processing apparatus 101 via the network 100.

Now, the description returns to step S1804. If it is determined in step S1804 that "Bookbinding Printing" is not selected in the printing method selection section 621 (NO in in step S1804), the processing proceeds to step S1806.

In step S1806, the information processing apparatus 102 determines whether poster printing is selected in the page layout selection section 623. If it is determined in step S1806 that poster printing is selected in the page layout selection section 623 (YES in step S1806), the processing proceeds to step S1807.

In step S1807, the information processing apparatus 102 generates a print job including the setting of poster printing, information indicating the number of divisions of the poster, and the setting of density correction as the grayscale discrimination improvement function, and transmits the print job to the image processing apparatus 101 via the network 100.

Now, the description returns to step S1806. If it is determined in step S1806 that poster printing is not selected in the page layout selection section 623 (NO in step S1806), the processing proceeds to step S1808.

In step S1808, the information processing apparatus 102 generates a print job that does not include the setting of bookbinding printing or the setting of poster printing, but includes the setting of density correction as the grayscale discrimination improvement function. Then, the information processing apparatus 102 transmits the print job to the image processing apparatus 101 via the network 100.

Now, the description returns to step S1802. If it is determined in step S1802 that "Correct Density" is not selected in the function selection section 642 (NO in step S1802), the processing proceeds to step S1803.

In step S1803, the information processing apparatus 102 generates a print job that does not include the setting of density correction as the grayscale discrimination improvement function. Then, the information processing apparatus 102 transmits the print job to the image processing apparatus 101 via the network 100. More specifically, step S1803 includes steps similar to steps S1804 to S1808. However, the print job generated in each of steps S1805, S1808, and S1807 included in step S1803 does not include the setting of density correction as the grayscale discrimination improvement function.

Figure 19:
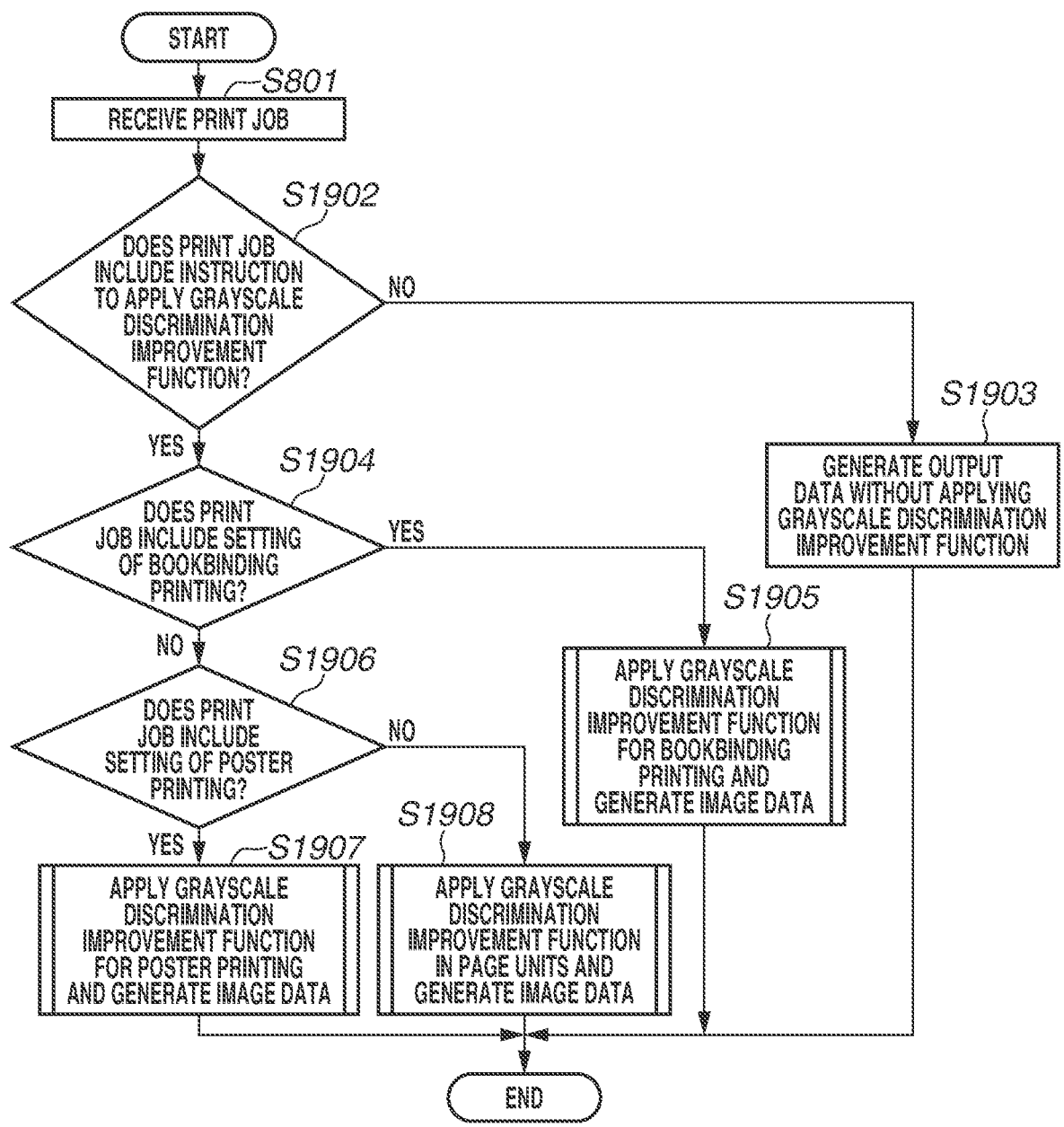
FIG. 19 is a flowchart illustrating an analysis performed by an image processing apparatus to generate image data for printing according to the second exemplary embodiment.

Next, with reference to a flowchart illustrated in FIG. 19, a description will be given of an analysis that is performed to generate image data for printing after the network device 408 of the image processing apparatus 101 according to the present exemplary embodiment receives a print job. Steps S1902, S1904, and S1906 in FIG. 19 correspond to step S802 in FIG. 8. Steps S1903, S1905, S1907, and S1908 in FIG. 19 correspond to steps S803 to S807 in FIG. 8.

In step S801, the image processing apparatus 101 receives a print job transmitted from the information processing apparatus 102 via the network 100.

In step S1902, the image processing apparatus 101 determines whether the print job includes an instruction to apply the grayscale discrimination improvement function. If it is determined in step S1902 that the print job does not include the instruction to apply the grayscale discrimination improvement function (NO in step S1902), the processing proceeds to step S1903.

In step S1903, the image processing apparatus 101 generates output data without applying the grayscale discrimination improvement function. At this time, in a case where input color data represented by colors in the RGB format is to be output in grayscale mode, input RGB values are converted to grayscale using a predetermined conversion formula to generate image data to be used in printing. Then, the generated image data is transmitted to the printing device 404.

If it is determined in step S1902 that the print job includes the setting of density correction as the grayscale discrimination improvement function (YES in step S1902), the processing proceeds to step S1904. In step S1904, the image processing apparatus 101 determines whether the print job includes the setting of bookbinding printing. If it is determined in step S1904 that the print job includes the setting of bookbinding printing (YES in step S1904), the processing proceeds to step S1905.

In step S1905, the image processing apparatus 101 applies the grayscale discrimination improvement function for bookbinding printing, generates image data to be used in printing, and transmits the image data to the printing device 404. The details of step S1905 will be described below with reference to FIG. 20.

If it is determined in step S1904 that the print job does not include the setting of bookbinding printing (NO in step S1904), the processing proceeds to step S1906. In step S1906, the image processing apparatus 101 determines whether the print job includes the setting of poster printing.

If it is determined in step S1906 that the print job includes the setting of poster printing (YES in step S1906), the processing proceeds to step S1907. In step S1907, the image processing apparatus 101 applies the grayscale discrimination improvement function for poster printing, generates image data to be used in printing, and transmits the image data to the printing device 404. The details of step S1907 will be described below with reference to FIG. 21.

If it is determined in step S1906 that the print job does not include the setting of poster printing (NO in step S1906), the processing proceeds to step S1908. In step S1908, the image processing apparatus 101 applies the grayscale discrimination improvement function on a page-by-page basis, generates image data to be used in printing, and transmits the image data to the printing device 404. The details of step S1908 will be described below with reference to FIG. 22.

Figure 20:
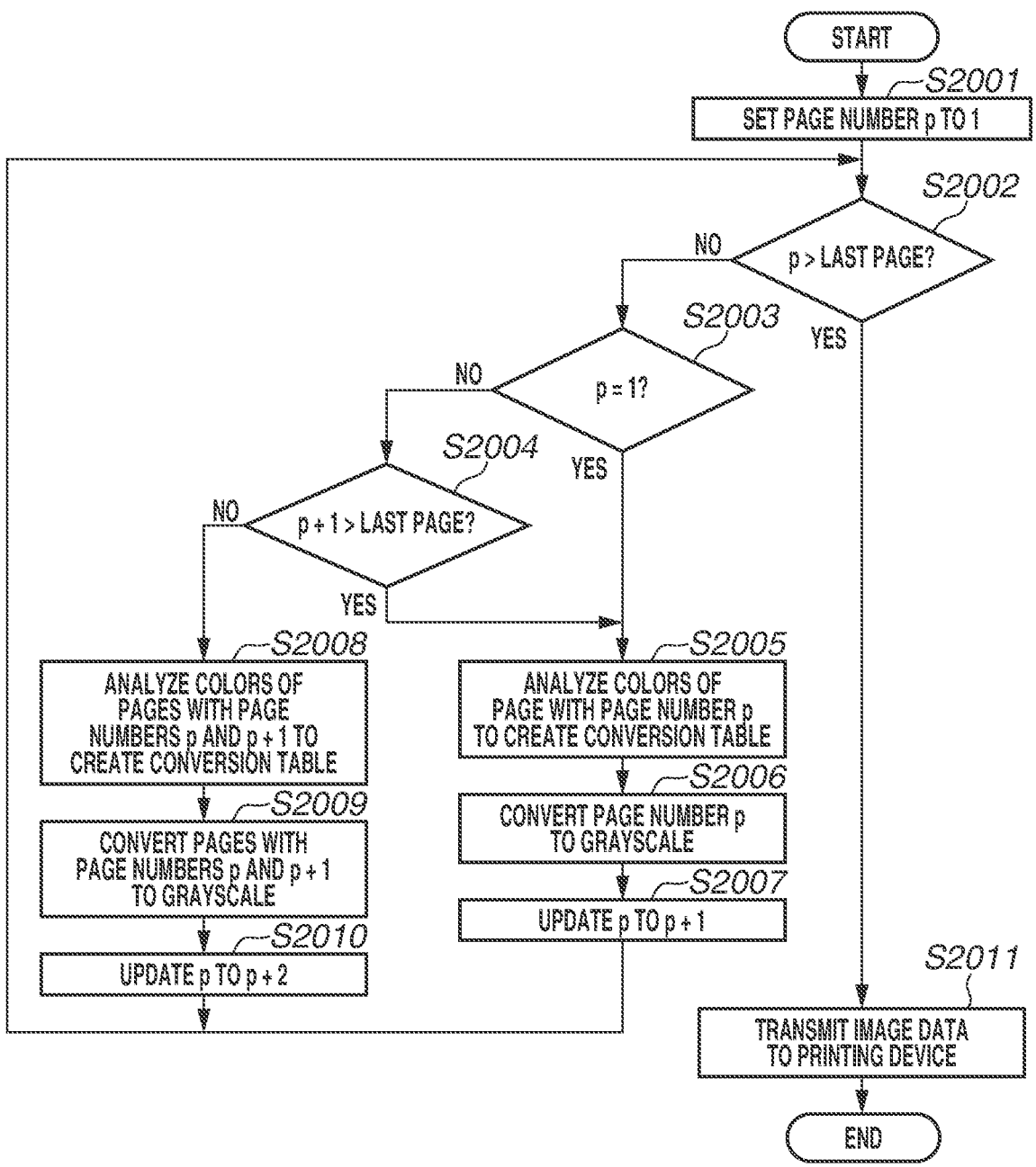
FIG. 20 is a flowchart illustrating application of a grayscale discrimination improvement function in the case of bookbinding printing according to the second exemplary embodiment.

The processing of step S1905 will be described with reference to a flowchart illustrated in FIG. 20.

In step S2001, the image processing apparatus 101 sets a page number p to 1. In step S2002, the image processing apparatus 101 determines whether p is greater than the page number of the last page.

If it is determined in step S2002 that p is greater than the page number of the last page (YES in step S2002), the processing proceeds to step S2011. If it is determined in step S2002 that p is not greater than the page number of the last page (NO in step S2002), the processing proceeds to step S2003. In step S2003, the image processing apparatus 101 determines whether p is 1. If it is determined in step S2003 that p is 1 (YES in step S2003), the processing proceeds to step S2005. If it is determined in step S2003 that p is not 1 (NO in step S2003), the processing proceeds to step S2004.

In step S2004, the image processing apparatus 101 determines whether p+1 is greater than the page number of the last page. If it is determined in step S2004 that p+1 is not greater than the page number of the last page (NO in step S2004), the processing proceeds to step S2008. If it is determined in step S2004 that p+1 is greater than the page number of the last page (YES in step S2004), the processing proceeds to step S2005.

In step S2005, the image processing apparatus 101 analyzes colors included in a page with the page number p to create a conversion table. In step S2006, the image processing apparatus 101 converts the page with the page number p to grayscale using the conversion table created in step S2005. In step S2007, the image processing apparatus 101 updates p to p+1.

In step S2008, the image processing apparatus 101 analyzes colors included in pages with the page numbers p and p+1 to create a conversion table. In step S2009, the image processing apparatus 101 converts the pages with the page numbers p and p+1 to grayscale using the conversion table created in step S2008. In step S2010, the image processing apparatus 101 updates p to p+2.

Now, the description returns to step S2002. If the conversion of all the pages to grayscale is completed in step S2002 (YES in step S2002), the processing proceeds to step S2011. In step S2011, the image processing apparatus 101 transmits all the pieces of image data converted to grayscale to the printing device 404.

Figure 21:
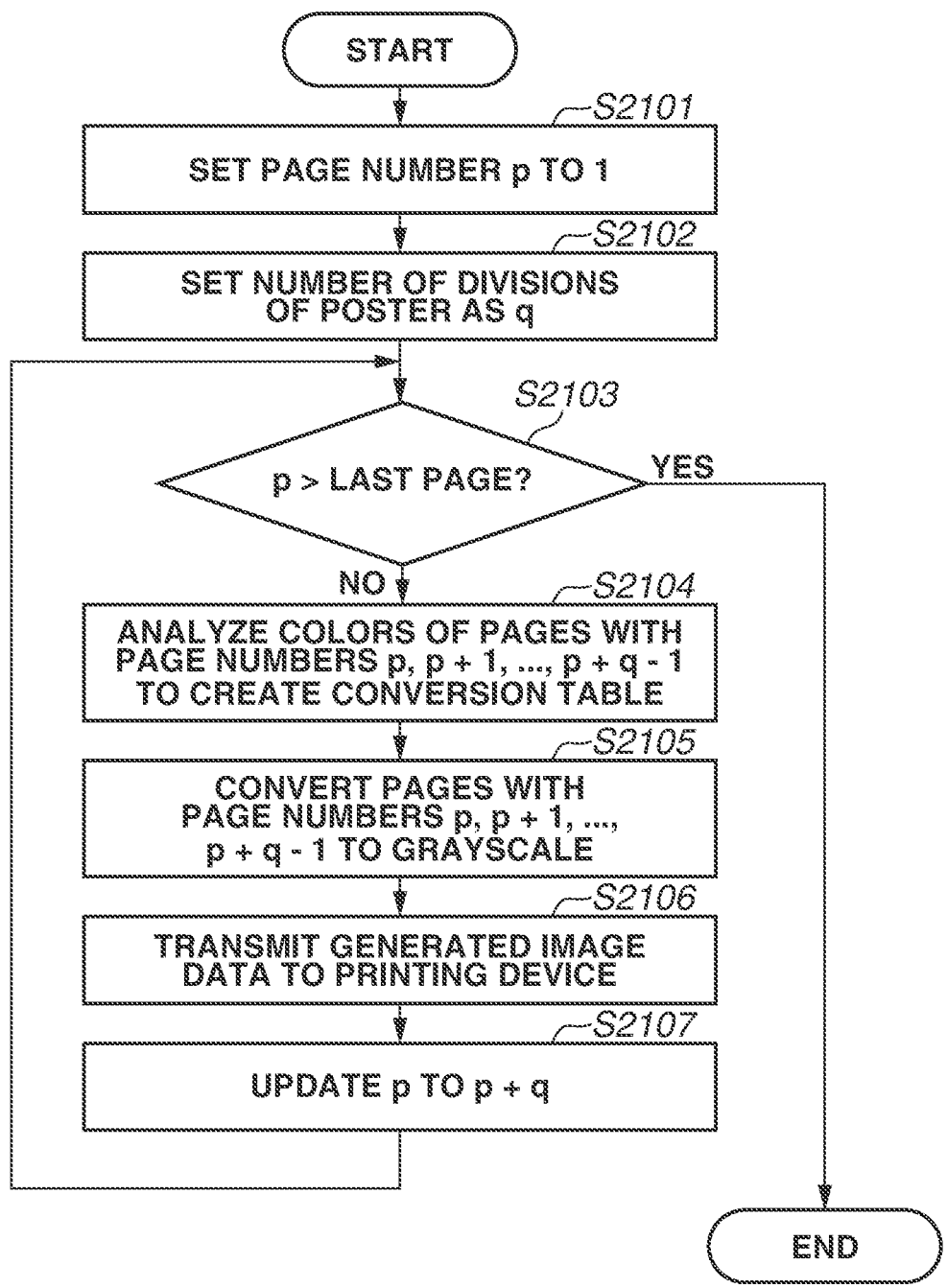
FIG. 21 is a flowchart illustrating application of a grayscale discrimination improvement function in the case of poster printing according to the second exemplary embodiment.

Next, the processing of step S1907 will be described with reference to a flowchart illustrated in FIG. 21.

In step S2101, the image processing apparatus 101 sets a page number p to 1. In step S2102, the image processing apparatus 101 sets the number of divisions of the poster included in the received print job, as the number of divisions q. In step S2103, the image processing apparatus 101 determines whether p is greater than the page number of the last page.

If it is determined in step S2103 that p is greater than the page number of the last page (YES in step S2103), the processing ends. If it is determined in step S2103 that p is not greater than the page number of the last page (NO in step S2103), the processing proceeds to step S2104. In step S2104, the image processing apparatus 101 analyzes colors included in pages with the page numbers p, p+1, p+q−1 to create a conversion table.

In step S2105, the image processing apparatus 101 converts the pages with the page numbers p, p+1, p+q−1 to grayscale using the conversion table created in step S2105. In step S2106, the image processing apparatus 101 transmits, to the printing device 404, image data that is generated by performing the grayscale conversion and is to be used in printing. In step S2107, the image processing apparatus 101 updates p to p+q.

Figure 22:
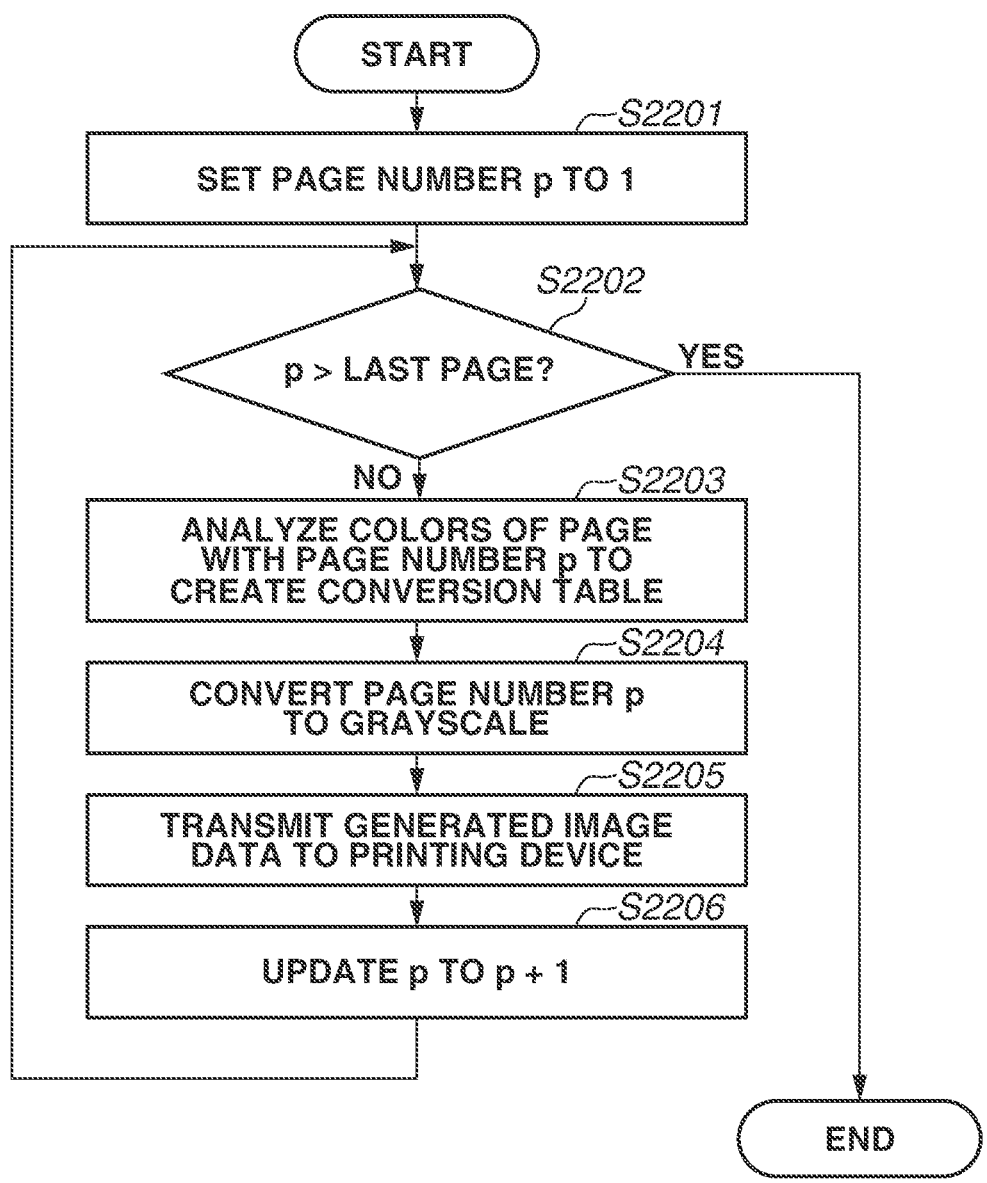
FIG. 22 is a flowchart illustrating application of a grayscale discrimination improvement function in the case of neither poster printing nor bookbinding printing according to the second exemplary embodiment.

Next, the processing of step S1908 will be described with reference to a flowchart illustrated in FIG. 22.

In step S2201, the image processing apparatus 101 sets a page number p to 1. In step S2202, the image processing apparatus 101 determines whether p is greater than the page number of the last page. If it is determined in step S2202 that p is greater than the page number of the last page (YES in step S2202), the processing ends. If it is determined in step S2202 that p is not greater than the page number of the last page (NO in step S2202), the processing proceeds to step S2203.

In step S2203, the image processing apparatus 101 analyzes colors included in a page with the page number p to create a conversion table. In step S2204, the image processing apparatus 101 converts the page with the page number p to grayscale using the conversion table created in step S2204. In step S2205, the image processing apparatus 101 transmits, to the printing device 404, image data that is generated by performing the grayscale conversion and is to be used in printing. In step S2206, the image processing apparatus 101 updates p to p+1.

With the configuration according to the present exemplary embodiment, by using the processing for determining the UI restriction control, it is possible to restrict the simultaneous setting of the grayscale discrimination improvement function and bookbinding printing or poster printing, similarly to the first exemplary embodiment. As a result, it is possible to prevent the situation where, when color conversion processing that produces different grayscale conversion results for pages having different feature amounts is performed, portions originally having the same colors are converted to grayscale values having different densities and this results in a final output product having an unnatural appearance.

While various examples and exemplary embodiments of the disclosure have been described above, the spirit and scope of the disclosure are not limited to a particular description in the specification.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-067703, filed Apr. 3, 2020, which is hereby incorporated by reference herein in its entirety.

What is claimed is:

1. An information processing apparatus comprising:
a transmission interface (IF) configured to transmit a print job to an image processing apparatus; and
a controller having one or more processors which execute instructions stored in one or more memories, the controller being configured to:
perform a first print setting indicating a poster printing function that divides a single piece of image data into a plurality of pieces of image data and generates print jobs, and a second print setting indicating a correction function for correcting calculated gray values when the image processing apparatus converts a plurality of pieces of color image data to grayscale, based on a number of colors acquired from each of the plurality of pieces of color image data;
generate a print job based on the performed first print setting or the performed second print setting and image data; and
cause the transmission IF to transmit the generated print job,
wherein the controller is configured to, in a state where one of the first print setting and the second print setting is performed, not perform the other print setting.

2. An information processing apparatus comprising:
a transmission interface (IF) configured to transmit a print job to an image processing apparatus; and
a controller having one or more processors which execute instructions stored in one or more memories, the controller being configured to:
perform a first print setting indicating a bookbinding printing function that lays out a plurality of pieces of image data for bookbinding, and a second print setting indicating a correction function for correcting calculated gray values when the image processing apparatus converts a plurality of pieces of color image data to grayscale, based on a number of colors acquired from each of the plurality pieces of color image data;
generate a print job based on the performed first print setting or the performed second print setting and image data; and
cause the transmission IF to transmit the generated print job,
wherein the controller is configured to, in a state where one of the first print setting and the second print setting is performed, not perform the other print setting.

3. The information processing apparatus according to claim 1, further comprising a display configured to display a first display section and a second display section, wherein the first display section is configured to receive the first print setting and the second display section is configured to receive the second print setting,
wherein the controller controls the display to display the first display section and the second display section, and
wherein, in a state where the first print setting is performed, the controller controls the display so that the second display section does not receive the second print setting.

4. The information processing apparatus according to claim 3, wherein the controller controls the display so that the second print setting is grayed out in a print setting reception display of the second display section.

5. The information processing apparatus according to claim 3, wherein, in a case where the second display section receives selection of the second print setting, the controller notifies a user of a message.

6. The information processing apparatus according to claim 1, further comprising a display configured to display a first display section and a second display section, wherein the first display section is configured to receive the first print setting and the second display section is configured to receive the second print setting,
wherein the controller controls the display to display the first display section and the second display section, and
wherein, in a state where the second print setting is performed, the controller controls the display so that the first display section does not receive the first print setting.

7. The information processing apparatus according to claim 6, wherein the controller controls the display so that the first print setting is grayed out in a print setting reception display of the first display section.

8. The information processing apparatus according to claim 6, wherein, in a case where the first display section receives selection of the first print setting, the controller notifies a user of a message.

9. The information processing apparatus according to claim 3, further comprising a storage configured to store function information regarding a plurality of image processing apparatuses,
wherein the display is configured to display a third display section that is configured to receive selection of an image processing apparatus as a transmission destination of the print job from among the plurality of image processing apparatuses, and
wherein, in a case where the function information regarding the image processing apparatus of which selection is received by the third display section does not include the correction function, the controller controls the display to hide the second display section.

10. The information processing apparatus according to claim 9, wherein, in a case where the function information regarding the image processing apparatus of which selection is received by the third display section includes the correction function and the correction function for correcting the calculated gray values based on a number of colors acquired from the plurality of pieces of color image data, the controller controls the display to display the second display section so that the second print setting is receivable by the second display section, regardless of whether the first print setting is performed.

11. The information processing apparatus according to claim 3, further comprising a storage configured to store function information regarding a plurality of image processing apparatuses,
wherein the display is configured to display a third display section that is configured to receive selection of an image processing apparatus as a transmission destination of the print job from among the plurality of image processing apparatuses, and
wherein, in a case where the function information regarding the image processing apparatus of which selection is received by the third display section does not include the correction function, the controller controls the display to display the second display section so that the second display section does not receive the second print setting.

12. The information processing apparatus according to claim 3, wherein the controller controls the display to display the first display section and the second display section on different screens.

13. The information processing apparatus according to claim 2, further comprising a display configured to display a first display section and a second display section, wherein the first display section is configured to receive the first print setting and the second display section is configured to receive the second print setting,
   wherein the controller controls the display to display the first display section and the second display section, and
   wherein, in a state where the first print setting is performed, the controller controls the display so that the second display section does not receive the second print setting.

14. The information processing apparatus according to claim 13, wherein the controller controls the display so that the second print setting is grayed out in a print setting reception display of the second display section.

15. The information processing apparatus according to claim 13, wherein, in a case where the second display section receives selection of the second print setting, the controller notifies a user of a message.

16. The information processing apparatus according to claim 2, further comprising a display configured to display a first display section and a second display section, wherein the first display section is configured to receive the first print setting and the second display section is configured to receive the second print setting,
   wherein the controller controls the display to display the first display section and the second display section, and
   wherein, in a state where the second print setting is performed, the controller controls the display so that the first display section does not receive the first print setting.

17. The information processing apparatus according to claim 16, wherein the controller controls the display so that the first print setting is grayed out in a print setting reception display of the first display section.

18. The information processing apparatus according to claim 16, wherein, in a case where the first display section receives selection of the first print setting, the controller notifies a user of a message.

19. A method for controlling an information processing apparatus including a first print setting indicating a poster printing function that divides a single piece of image data into a plurality of pieces of image data and generates print jobs, and a second print setting indicating a correction function for correcting calculated gray values when an image processing apparatus converts a plurality of pieces of color image data to grayscale, based on a number of colors acquired from each of the plurality of pieces of color image data, the method comprising:
   restricting the first print setting and the second print setting so that, in a state where one of the first print setting and the second print setting is performed, the other print setting is not to be performed;
   generating a print job based on the performed print setting and image data; and
   transmitting the generated print job.

20. A method for controlling an information processing apparatus including a first print setting indicating a bookbinding printing function that lays out a plurality of pieces of image data for bookbinding, and a second print setting indicating a correction function for correcting calculated gray values when an image processing apparatus converts a plurality of pieces of color image data to grayscale, based on a number of colors acquired from each of the plurality of pieces of color image data, the method comprising:
   restricting the first print setting and the second print setting so that, in a state where one of the first print setting and the second print setting is performed, the other print setting is not to be performed;
   generating a print job based on the performed print setting and image data; and
   transmitting the generated print job.

* * * * *